(12) United States Patent
Koreeda et al.

(10) Patent No.: US 7,738,345 B2
(45) Date of Patent: Jun. 15, 2010

(54) OPTICAL DISC DRIVE AND OBJECTIVE LENS FOR THE SAME

(75) Inventors: Daisuke Koreeda, Saitama (JP); Koichi Maruyama, Tokyo (JP); Shuichi Takeuchi, Saitama (JP); Yoshiyuki Tashiro, Tokyo (JP)

(73) Assignee: Hoya Corporation, Tokyo (JP)

( * ) Notice: Subject to any disclaimer, the term of this patent is extended or adjusted under 35 U.S.C. 154(b) by 881 days.

(21) Appl. No.: 11/456,943

(22) Filed: Jul. 12, 2006

(65) Prior Publication Data
US 2007/0014211 A1 Jan. 18, 2007

(30) Foreign Application Priority Data
Jul. 12, 2005 (JP) ............................ P2005-203094

(51) Int. Cl.
*G11B 7/00* (2006.01)
(52) U.S. Cl. ............................ 369/112.06; 369/112.23; 369/112.26; 369/112.01; 369/112.08
(58) Field of Classification Search ............ 369/112.01, 369/112.06, 112.08, 112.12, 112.13, 112.23, 369/112.26, 112.28
See application file for complete search history.

(56) References Cited

U.S. PATENT DOCUMENTS

| | | | |
|---|---|---|---|
| 6,900,949 B2 | 5/2005 | Takeuchi et al. | |
| 6,982,838 B2 | 1/2006 | Maruyama et al. | |
| 7,035,193 B2 | 4/2006 | Takeuchi et al. | |
| 7,038,862 B2 | 5/2006 | Maruyama et al. | |
| 2001/0050894 A1* | 12/2001 | Takeuchi | 369/112.08 |
| 2004/0047269 A1 | 3/2004 | Ikenaka et al. | |
| 2004/0136096 A1* | 7/2004 | Takeuchi et al. | 359/754 |
| 2004/0213131 A1* | 10/2004 | Kimura et al. | 369/112.03 |
| 2004/0257958 A1* | 12/2004 | Kimura et al. | 369/112.03 |
| 2005/0002118 A1* | 1/2005 | Maruyama et al. | 359/719 |
| 2005/0078593 A1* | 4/2005 | Maruyama et al. | 369/112.23 |
| 2005/0157624 A1 | 7/2005 | Koreeda et al. | |

(Continued)

FOREIGN PATENT DOCUMENTS

JP 2004-247025 9/2004

OTHER PUBLICATIONS

U.S. Appl. No. 11/419,810 to Koreeda et al., filed May 23, 2006.

*Primary Examiner*—Wayne R Young
*Assistant Examiner*—LaTanya Bibbins
(74) *Attorney, Agent, or Firm*—Greenblum & Bernstein P.L.C.

(57) ABSTRACT

There is provided an objective lens used for three types of optical discs including by selectively using one of three types of light beams. At least one of surfaces of the objective lens is provided with a first region converging the third light beam on a recoding surface of the third optical disc. The first region has a step structure configured to have concentric refractive surface zones and to give an optical path length difference to an incident beam at each step formed between adjacent refractive surface zones. The step structure is configured such that the optical path length difference given by each step is substantially equal to an odd multiple of a wavelength of a first light beam, and a value of differentiation of an optical path difference function defining the step structure crosses zero in a height ranging from 30% to 70% of an effective diameter of the first region.

18 Claims, 13 Drawing Sheets

U.S. PATENT DOCUMENTS

| | | |
|---|---|---|
| 2005/0201250 A1* | 9/2005 | Mimori et al. ......... 369/112.01 |
| 2005/0270958 A1* | 12/2005 | Ikenaka ................. 369/112.23 |
| 2005/0281173 A1 | 12/2005 | Koreeda et al. |
| 2006/0114796 A1 | 6/2006 | Maruyama et al. |
| 2006/0176578 A1* | 8/2006 | Kimura ...................... 359/719 |

* cited by examiner

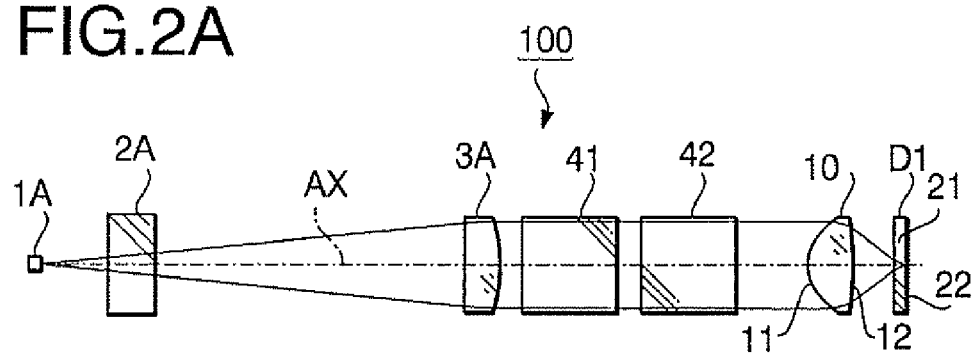
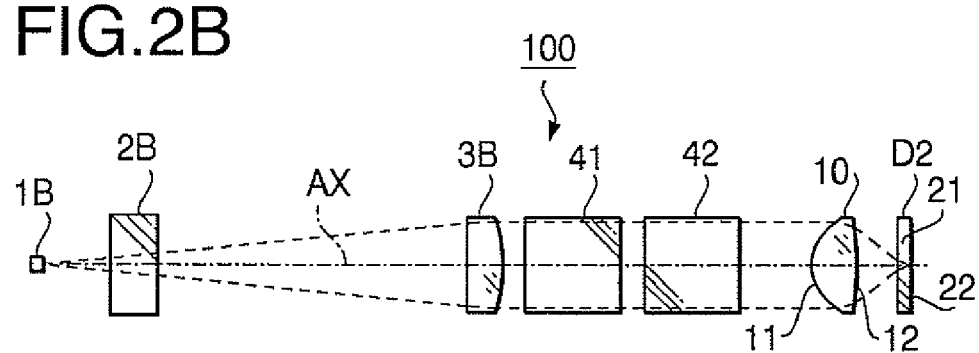
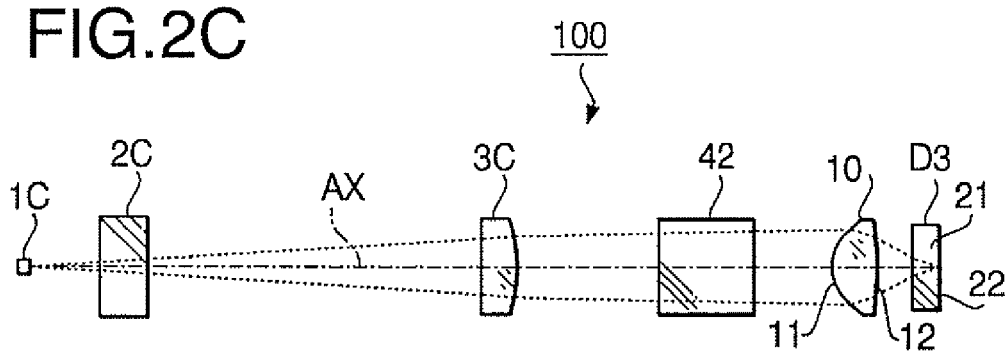

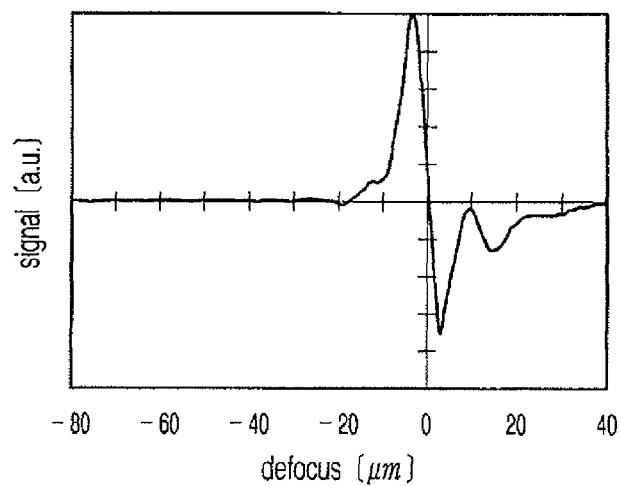
FIG.12
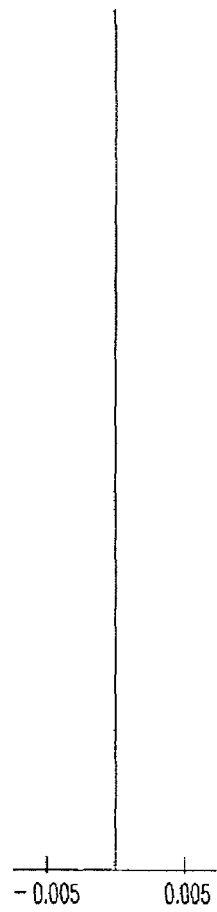 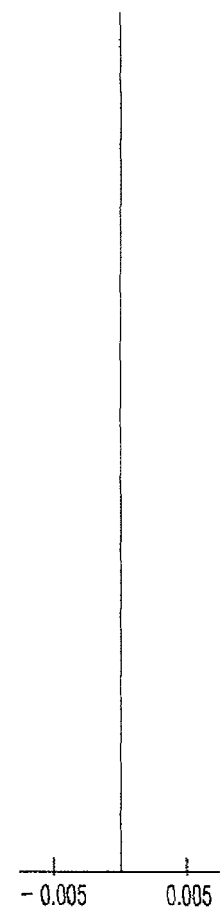 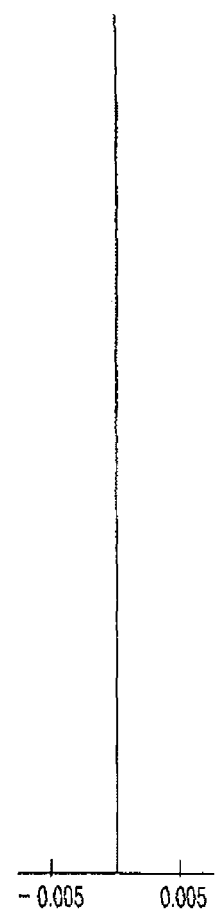
FIG.13A  FIG.13B  FIG.13C

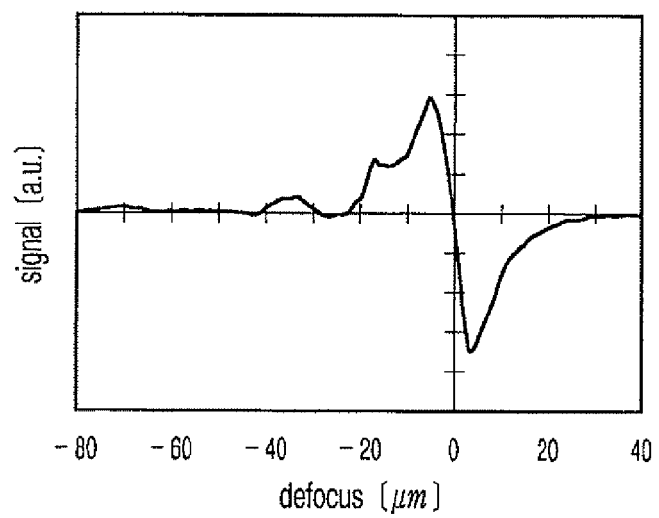
FIG. 14
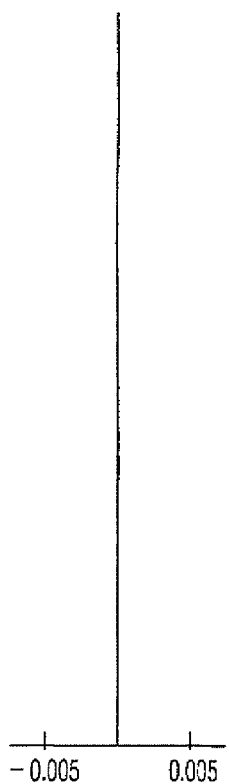
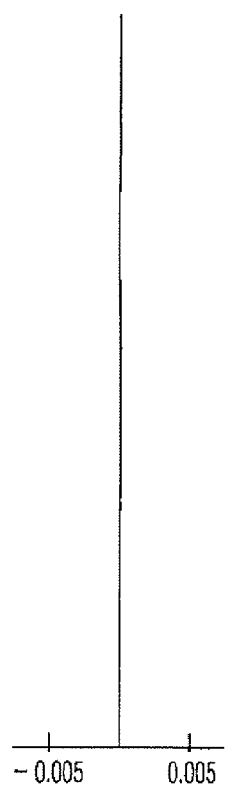
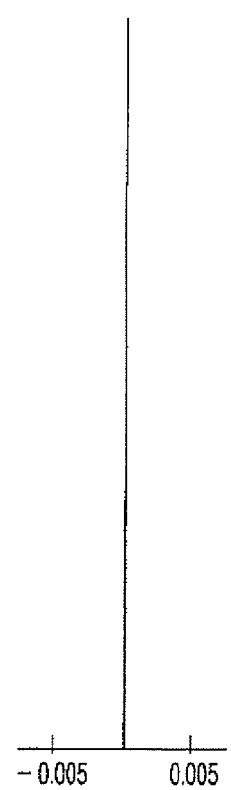
FIG.15A    FIG.15B    FIG.15C

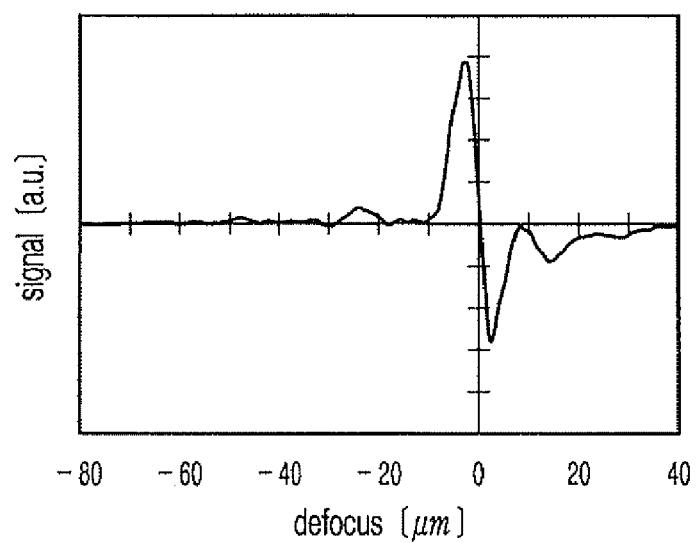
FIG.18
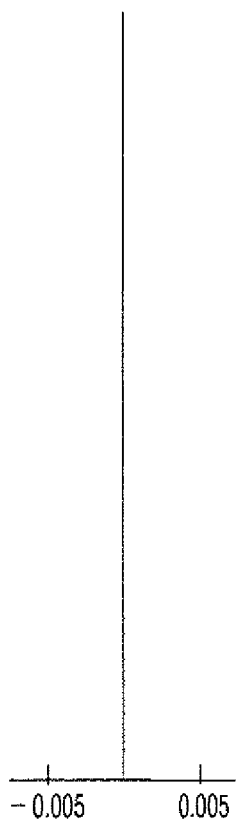
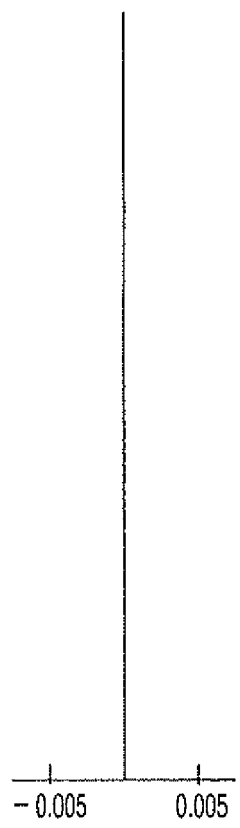
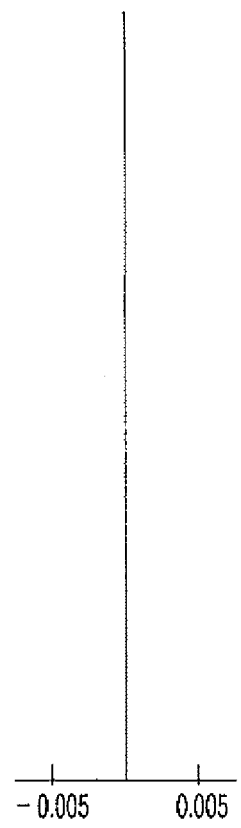
FIG.19A  FIG.19B  FIG.19C

OPTICAL DISC DRIVE AND OBJECTIVE LENS FOR THE SAME

BACKGROUND OF THE INVENTION

The present invention relates to an objective lens employed in an optical disc drive for recording information to and/or reproducing information from a plurality of types of optical discs having different recording densities.

There are various types of optical discs, such as a CD and a DVD, having different recording densities and different thicknesses of cover layers. Recently, a new technical standard optical disc, such as an HD DVD or a BD (Blue-ray Disc), having a recording density higher than that of the DVD is becoming commercially practical. Such a new technical standard optical disc has a cover layer thickness smaller than or equal to that of the DVD. Considering a usability for a user of these type of optical discs (i.e., three types of optical discs), an optical disc drive (i.e., an optical system for the optical disc drive) capable of supporting all of the three types of optical discs (i.e., to have compatibility with the three types of optical discs) is desirable.

The term "optical disc drive" as used herein includes an optical disc drive designed specifically for recording information to an optical disc, an optical disc drive specifically designed for reproducing information from an optical disc, and an optical disc drive having both of functions of recording information to and reproducing information from an optical disc, The expression "an optical disc drive has compatibility with the three types of optical discs" as used herein means that a recording operation and/or a reproducing operation are guaranteed for all of the three types of optical discs, without the need for replacement of parts in the optical disc drive.

In order to support a plurality of types of optical discs of different technical standards, it is required to change a numerical aperture (NA) of light used for recordation or reproduction of information while compensating for spherical aberration which varies depending on a thickness of a cover layer of an optical disc being used so that a beam spot having a diameter suitable for a recording density of an optical disc being used can be achieved. A beam spot diameter decreases as a wavelength of a laser beam decreases. Therefore, an optical disc drive generally uses a plurality of types of laser beams having different wavelengths.

For example, a laser beam having a wavelength of approximately 790 nm is used for the CD, and a laser beam having a wavelength of approximately 660 nm which is shorter than that for the CD is used for the DVD. A laser beam having a shorter wavelength (e.g., approximately 408 nm which is so-called blue laser) than that for the DVD is used for the new technical standard optical disc because of its recording density higher than that of the DVD.

In order to converge a laser beam onto a recording surface of each of the plurality of types of optical discs, one or a plurality of optical elements forming an optical system of an optical disc drive is provided with an annular zone structure on one lens surface in the optical system. The annular zone structure formed on the entire region of the lens surface includes minute steps formed between adjacent annular zones so that each of the laser beams having different wavelengths can be converged onto a recording surface of each of the plurality of types of optical discs by the effect of the annular zone structure.

It is preferable that the optical element provided with the annular zone structure has a function of compensating for spherical aberration caused when a wavelength of a laser beam shifts from its design wavelength. The term design wavelength means a wavelength of a laser beam suitable for recordation or reproduction of information for each of the plurality of types of optical discs.

In Japanese Patent Provisional Publication No. 2004-247025, an optical pick-up supporting all of the CD, DVD and HD DVD is disclosed. In the optical pick-up disclosed in the publication, an objective lens is provided with an annular zone structure, for which third-order diffracted light is used for recordation or reproduction of information for an optical disc having the highest recording density and second-order diffracted light is used for recordation or reproduction of information for the DVD or CD. By employing such an objective lens, the optical pick-up is able to form a beam spot suitable for recordation or reproduction of information for each of the plurality of types of optical discs. By this configuration, the optical pick-up achieves the function of supporting the three types of optical discs having different recording densities.

However, the optical pick-up disclosed in the publication has a drawback that the optical pick-up can achieve only 40% usage efficiency of light for recordation or reproduction of information for the CD and undesired diffraction order light (e.g., first-order diffracted light in this case) having the light quantity corresponding to 40% usage efficiency of light is undesirably generated. By such a drawback, a waveform of a focus error signal may be deformed, thereby decreasing focusing performance. Further, in this case a suitable beam spot diameter can not be achieved.

SUMMARY OF THE INVENTION

The present invention is advantageous in that it provides an objective lens capable of forming a suitable beam spot while suppressing spherical aberration for each of three types of optical discs, preventing deterioration of focusing performance even when a step structure which produces undesirable diffraction order light for a lower recording density optical disc (e.g., the CD) is formed thereon, reducing a beam spot diameter to a desired level, and keeping high efficiency of light for a relatively high recording density optical disc (e.g, the HD DVD).

According to an aspect of the invention, there is provided an objective lens used for recording information to and/or reproducing information from three types of optical discs including a first optical disc having a highest recording density, a second optical disc having a second highest recording density and a third optical disc having a lowest recording density by selectively using one of three types of light beams including a first light beam having a shortest wavelength, a second light beam having a second shortest wavelength and a third light beam having a longest wavelength. At least one of surfaces of the objective lens is provided with a first region converging the third light beam on a recoding surface of the third optical disc. The first region comprises a step structure configured to have a plurality of concentric refractive surface zones and to give an optical path length difference to an incident beam at each step formed between adjacent refractive surface zones. The step structure is configured such that the optical path length difference given by each step is substantially equal to an odd multiple of the wavelength of the first light beam, and a value of differentiation of an optical path difference function defining the step structure crosses zero in a height ranging from 30% to 70% of an effective diameter of the first region.

With this configuration, it is possible to form a suitable beam spot for each of the three types of optical discs while suppressing spherical aberration for each of the three types of optical discs.

In at least one aspect, when the wavelength of the first light beam is represented by $\lambda 1$ (nm), an optical path length difference given by each step to the first light beam is represented by $\Delta OPD$ (nm), the step structure satisfies a condition:

$$2N+0.70<|\Delta OPD/\lambda 1|<2N+1.30 \quad (1)$$

where N represents an integer. When the optical path difference function is expressed by an equation:

$$\phi(h)=(P_2 h^2+P_4 h^4+P_6 h^6+P_8 h^8+P_{10} h^{10}+P_{12} h^{12})m\lambda \quad (2)$$

where $P_2$, $P_4$ and $P_6$ ... are coefficients of second, fourth, sixth ... orders, h represents a height from an optical axis, m represents a diffraction order at which diffraction efficiency is maximized, and $\lambda$ represents a working wavelength of a light beam being used, the objective lens satisfies a condition:

$$0.00<(f1\times P_2)/(t3-t1)<18.00 \quad (3)$$

where f1 represents a focal length of the objective lens defined when the first light beam is used, and t1 and t3 (where t1<t3) respectively represent thicknesses of cover layers of the first and third optical discs.

In at least one aspect, the objective lens further satisfies a condition:

$$2.50<(f1\times P_2)/(t3-t1)<13.00 \quad (4).$$

According to another aspect of the invention, there is provided an optical disc drive for recording information to and/or reproducing information from three types of optical discs including a first optical disc having a highest recording density, a second optical disc having a second highest recording density and a third optical disc having a lowest recording density by selectively using one of three types of light beams including first, second and third light beams. The optical disc drive is provided with an objective lens. When wavelengths of the first to third light beams are respectively represented by $\lambda 1$ (nm), $\lambda 2$ (nm) and $\lambda 3$ (nm), a relationship $\lambda 1<\lambda 2<\lambda 3$ is satisfied. When a numerical aperture necessary for recording information to or reproducing information from the first optical discs is represented by NA1, a numerical aperture necessary for recording information to or reproducing information from the second optical discs is represented by NA2, and a numerical aperture necessary for recording information to or reproducing information from the third optical discs is represented by NA3, a relationship NA1>NA3 and NA2>NA3 is satisfied. When a thickness of a cover layer of the first optical disc requiring use of the first light beam is represented by t1, a thickness of a cover layer of the second optical disc requiring use of the second light beam is represented by t2, and a thickness of a cover layer of the third optical disc requiring use of the third light beam is represented by t3, t1≅0.6 mm, t2≅0.6 mm, and t3≅1.2 mm is satisfied. Each of the first and second light beams is incident on the objective lens as a substantially collimated beam, and the third light beam being incident on the objective lens 10 as a diverging beam. At least one of surfaces of the objective lens is provided with a first region converging the third light beam on a recoding surface of the third optical disc. The first region comprises a step structure configured to have a plurality of concentric refractive surface zones and to give an optical path length difference to an incident beam at each step formed between adjacent refractive surface zones.

In this configuration, in the first region, at least a boundary part of the step structure satisfies a condition:

$$2N+0.70<|\Delta OPD/\lambda 1|<2N+1.30 \quad (1)$$

where N represents an integer, and $\Delta OPD$ (nm) represents an optical path length difference given by the at least a boundary part of the first region to the first light beam. When an optical path difference function $\phi(h)$ defining the step structure is expressed by an equation:

$$\phi(h)=(P_2 h^2+P_4 h^4+P_6 h^6+P_8 h^8+P_{10} h^{10}+P_{12} h^{12})m\lambda \quad (2)$$

where $P_2$, $P_4$ and $P_6$ ... are coefficients of second, fourth, sixth ... orders, h represents a height from an optical axis, m represents a diffraction order at which diffraction efficiency is maximized, and $\lambda$ represents a working wavelength of a light beam being used, the objective lens satisfies a condition:

$$0.00<(f1\times P_2)/(t3-t1)<18.00 \quad (3)$$

where f1 represents a focal length of the objective lens defined when the first light beam is used.

With this configuration, it is possible to form a suitable beam spot for each of the three types of optical discs while suppressing spherical aberration for each of the three types of optical discs.

In at least one aspect, the optical disc drive further satisfies a condition:

$$2.50<(f1\times P_2)/(t3-t1)<13.00 \quad (4).$$

In at least one aspect, the objective lens is a single element lens having Abbe number satisfying a condition:

$$40\leq vd\leq 80 \quad (5).$$

The step structure satisfies a condition:

$$2.70<|\Delta OPD/\lambda 1|<3.30 \quad (6).$$

When a focal length and magnification of the objective lens when the first optical disc is used are respectively represented by f1 and M1, a focal length and magnification of the objective lens when the second optical disc is used are respectively represented by f2 and M2, and a focal length and magnification of the objective lens when the third optical disc is used are respectively represented by f3 and M3, the optical disc drive satisfies following conditions:

$$-0.02<f1\times M1<0.02 \quad (7),$$

$$-0.02<f2\times M2<0.02 \quad (8), \text{ and}$$

$$-0.12<f3\times M3<-0.04 \quad (9).$$

In at least one aspect, the objective lens is a single element lens having Abbe number satisfying a condition:

$$20\leq vd<40 \quad (10).$$

The step structure satisfies a condition:

$$2.70<|\Delta OPD/\lambda 1|<3.30 \quad (6).$$

When a focal length and magnification of the objective lens when the first optical disc is used are respectively represented by f1 and M1, a focal length and magnification of the objective lens when the second optical disc is used are respectively represented by f2 and M2, and a focal length and magnification of the objective lens when the third optical disc is used are respectively represented by f3 and M3, the optical disc drive satisfies following conditions:

$$-0.02<f1\times M1<0.02 \quad (7),$$

$$-0.02<f2\times M2<0.02 \quad (8), \text{ and}$$

$$-0.38<f3\times M3<-0.30 \quad (11).$$

In at least one aspect, the step structure satisfies a following condition:

$$1.32<|\Delta OPDC/\lambda 3|<1.62 \quad (12)$$

where ΔOPDC (nm) represents an optical path length difference given by the at least a boundary part of the step structure to the third light beam.

According to another aspect of the invention, there is provided an optical disc drive for recording information to and/or reproducing information from three types of optical discs including a first optical disc having a highest recording density, a second optical disc having a second highest recording density and a third optical disc having a lowest recording density by selectively using one of three types of light beams including first, second and third light beams. The optical disc drive is provided with an objective lens. Each of the first to third light beams is incident on the objective lens as a substantially collimated beam. When the wavelengths of the first to third light beams are respectively represented by λ1 (nm), λ2 (nm) and λ3 (nm), a relationship λ1<λ2<λ3 is satisfied. When a numerical aperture necessary for recording information to or reproducing information from the first optical discs is represented by NA1, a numerical aperture necessary for recording information to or reproducing information from the second optical discs is represented by NA2, and a numerical aperture necessary for recording information to or reproducing information from the third optical discs is represented by NA3, a relationship NA1 >NA3 and NA2>NA3 is satisfied. When a thickness of a cover layer of the first optical disc requiring use of the first light beam is represented by t1, a thickness of a cover layer of the second optical disc requiring use of the second light beam is represented by t2, and a thickness of a cover layer of the third optical disc requiring use of the third light beam is represented by t3, t1≅0.6 mm, t2≅0.6 mm, and t3≅1.2 mm is satisfied. Each of the first and second light beams is incident on the objective lens as a substantially collimated beam, and the third light beam being incident on the objective lens 10 as a diverging beam. At least one of surfaces of the objective lens is provided with a first region converging the third light beam on a recording surface of the third optical disc. The first region comprises a step structure configured to have a plurality of concentric refractive surface zones and to have at least two types of steps formed between adjacent ones of the plurality of concentric refractive surfaces zones, the at least two types of steps giving different optical path length differences to an incident beam.

In this configuration, in the first region, at least one step type of the two types of steps satisfies a condition:

$$2N+0.70<|\Delta OPD1/\lambda 1|<2N+1.30 \quad (13)$$

where ΔOPD1 (nm) represents an optical path length difference given by the at least one step, and N is an integer. When the step structure is defined by at least two types of optical path difference functions expressed by:

$$\phi i(h)=(P_2ih^2+P_4ih^4+P_6ih^6+P_8ih^8+P_{10}ih^{10}+P_{12}ih^{12})m\lambda \quad (14)$$

where φi(h) represents an i-th optical path difference function (i: an integer), $P_2i$, $P_4i$ and $P_6i$ ... are coefficients of second, fourth, sixth ... orders of the i-th optical path difference function, h represents a height from an optical axis of the objective lens, m represents a diffraction order at which diffraction efficiency of the incident beam is maximized, and λ represents a working wavelength of the incident beam, a condition:

$$0.00<(f1\times P_21)/(t3-t1)<18.00 \quad (15)$$

is satisfied for a first optical path difference function, where f1 represents a focal length of the objective lens for the first light beam.

With this configuration, it is possible to form a suitable beam spot for each of the three types of optical discs while suppressing spherical aberration for each of the three types of optical discs.

In at least one aspect, with regard to the first optical path difference function, the objective lens satisfies a condition:

$$2.50<(f1\times P_21)/(t3-t1)<13.00 \quad (16).$$

In at least one aspect, steps satisfying the condition (13) in the first region further satisfy a condition:

$$2.70<|\Delta OPD1/\lambda 1|<3.30 \quad (17).$$

In at least one aspect, the steps satisfying the condition (17) in the first region further satisfies a condition:

$$1.32<|\Delta OPDC1/\lambda 3|<1.62 \quad (18)$$

where OPDC1 (nm) represents an optical path length difference given by the step structure in the first region to the third light beam.

In at least one aspect, steps satisfying the condition (13) in the first region further satisfy a condition:

$$4.70<|\Delta OPD1/\lambda 1|<5.30 \quad (19).$$

In at least one aspect, the steps satisfying the condition (19) in the first region further satisfy a condition:

$$2.30<|\Delta OPDC1/\lambda 3|<2.60 \quad (20)$$

where OPDC1 (nm) represents an optical path length difference given by the step structure in the first region to the third light beam.

In at least one aspect, when an optical path length difference given by another step of the at least two types of steps different from the at least one step to the first light beam is represented by ΔOPD2 (nm), the objective lens satisfies a condition:

$$2L-0.21<|\Delta OPD2/\lambda 1|<2L+0.20 \quad (21).$$

In at least one aspect, the objective lens satisfies a condition:

$$1.80<|\Delta OPD2/\lambda 1|<2.20 \quad (22).$$

In at least one aspect, the objective lens includes a second region which is formed outside the first region and is configured to converge the first and second light beams on the recording surfaces of the first and second optical discs, respectively, and not to contribute to converging the third light beam. In this case, the second region gives at least an optical path length difference to an incident beam at each step formed between adjacent refractive surface zones. Further, an absolute value of an optical path length difference given by each step in the second region is different from an absolute value of an optical path length difference given by each step in the first region.

In at least one aspect, the objective lens includes a second region which is formed outside the first region and is configured to converge the first and second light beams on the recording surfaces of the first and second optical discs, respectively, and not to contribute to converging the third light beam. In this case, the second region gives at least an optical path length difference to an incident beam at each step formed between adjacent refractive surface zones; and an absolute value of an optical path length difference given by each step in the second region is different from the |ΔOPD1/λ1|.

In at least one aspect, the optical disc drive satisfies a condition:

$$f1\times NA1>f2\times NA2 \quad (23).$$

In this case, the objective lens includes a third region which is formed outside the second region and is configured to converge only the first light beam on the recording surface of the first optical disc and not to contribute to converging the second and third light beams. The third region gives at least an optical path length difference to an incident beam at each step formed between adjacent refractive surface zones. Furthers an absolute value of an optical path length difference given by each step in the third region is different from an absolute value of an optical path length difference given by each step in the second region.

In at least one aspect, the optical disc drive satisfies a condition:

$$f1 \times NA1 < f2 \times NA2 \tag{24}.$$

In this case, the objective lens includes a third region which is formed outside the second region and is configured to converge only the second light beam on the recording surface of the second optical disc and not to contribute to converging the first and third light beams. The third region gives at least an optical path length difference to an incident beam at each step formed between adjacent refractive surface zones. Further, an absolute value of an optical path length difference given by each step in the third region is different from an absolute value of an optical path length difference given by each step in the second region.

BRIEF DESCRIPTION OF THE ACCOMPANYING DRAWINGS

FIG. 2A is a partial optical block diagram of the optical disc drive illustrating an optical system for a first optical disc having the highest recording density.

FIG. 2B is a partial optical block diagram of the optical disc drive illustrating an optical system for a second optical disc having the second highest recording density.

FIG. 2C is a partial optical block diagram of the optical disc drive illustrating an optical system for a third optical disc having the lowest recording density.

FIG. 12 illustrates a focus error signal detected by a photoreceptor when the third optical disc is used in the optical disc drive according to a third example.

FIG. 13A is a graph illustrating spherical aberration caused when the first laser beam is used in the optical disc drive according to the third example.

FIG. 13B is a graph illustrating the spherical aberration caused when the second laser beam is used in the optical disc drive according to the third example.

FIG. 13C is a graph illustrating the spherical aberration caused when the third laser beam is used in the optical disc drive according to the third example.

FIG. 14 illustrates a focus error signal detected by a photoreceptor when the third optical disc is used in the optical disc drive according to a fourth example.

FIG. 15A is a graph illustrating spherical aberration caused when the first laser beam is used in the optical disc drive according to the fourth example.

FIG. 15B is a graph illustrating the spherical aberration caused when the second laser beam is used in the optical disc drive according to the fourth example.

FIG. 15C is a graph illustrating the spherical aberration caused when the third laser beam is used in the optical disc drive according to the fourth example.

FIG. 18 illustrates a focus error signal detected by a photoreceptor when the third optical disc is used in the optical disc drive according to a sixth example.

FIG. 19A is a graph illustrating spherical aberration caused when the first laser beam is used in the optical disc drive according to the sixth example.

FIG. 19B is a graph illustrating the spherical aberration caused when the second laser beam is used in the optical disc drive according to the sixth example.

FIG. 19C is a graph illustrating the spherical aberration caused when the third laser beam is used in the optical disc drive according to the sixth example.

DETAILED DESCRIPTION OF THE EMBODIMENTS

Hereinafter, an objective lens for an optical disc drive configured to support three types of optical discs based on different technical standards is described. In the following, an optical disc (e.g., an HD DVD or BD) having the highest recording density is referred to as an optical disc D1, an optical disc (e.g., a DVD or DVD-R) having a recording density lower than that of the first optical disc is referred to as an optical disc D2, and an optical disc (e.g., a CD or CD-R) having the lowest recording density is referred to as an optical disc D3. In this embodiment, the optical discs D1, D2 and D3 have the following thicknesses of cover layers t1, t2 and t3, respectively.

$t1 \approx 0.6$ mm $t2 \approx 0.6$ mm $t3 \approx 1.2$ mm

In order to record information to or reproduce information from each of the optical discs D1, D2 and 93, it is required to change an NA (numerical aperture) in accordance with a recording density of an optical disc being used so that a beam spot suitable for recordation or reproduction of information for the optical disc being used is achieved. If design numerical apertures suitable for recordation or reproduction of information for optical discs D1, D2 and D3 are represented by NA1, NA2, and NA3, respectively, the following relationship holds.

NA1>NA3 and NA2>NA3

That is, since a smaller beam spot is required for the optical discs D1 and D2 having relatively high recording densities, relatively high numerical apertures are used for the optical discs D1 and D2. By contrast a required NA for the optical disc D3 is relatively small because of its lower recording density. The optical disc drive includes a turn table (not shown) on which an optical disc is placed.

In order to support the three types of optical discs having different recording densities, the optical disc drive according to the embodiments is configured to emit laser beams having different wavelengths. More specifically, a laser beam (hereafter, referred to as a first laser beam) having the shortest wavelength is used to form a small beam spot suitable for recordation or reproduction of information for the optical disc D1, a laser beam (hereafter, referred to as a third laser beam) having the longest wavelength is used to form a large beam spot suitable for recordation or reproduction of information for the optical disc D3, and a laser beam (hereafter, referred to as a second laser beam) having a wavelength, which is longer than that of the first laser beam and shorter than that of the third laser beam, is used to form a relatively small beam spot suitable for recordation or reproduction of information for the optical disc D2.

First Embodiment

Figure 1:
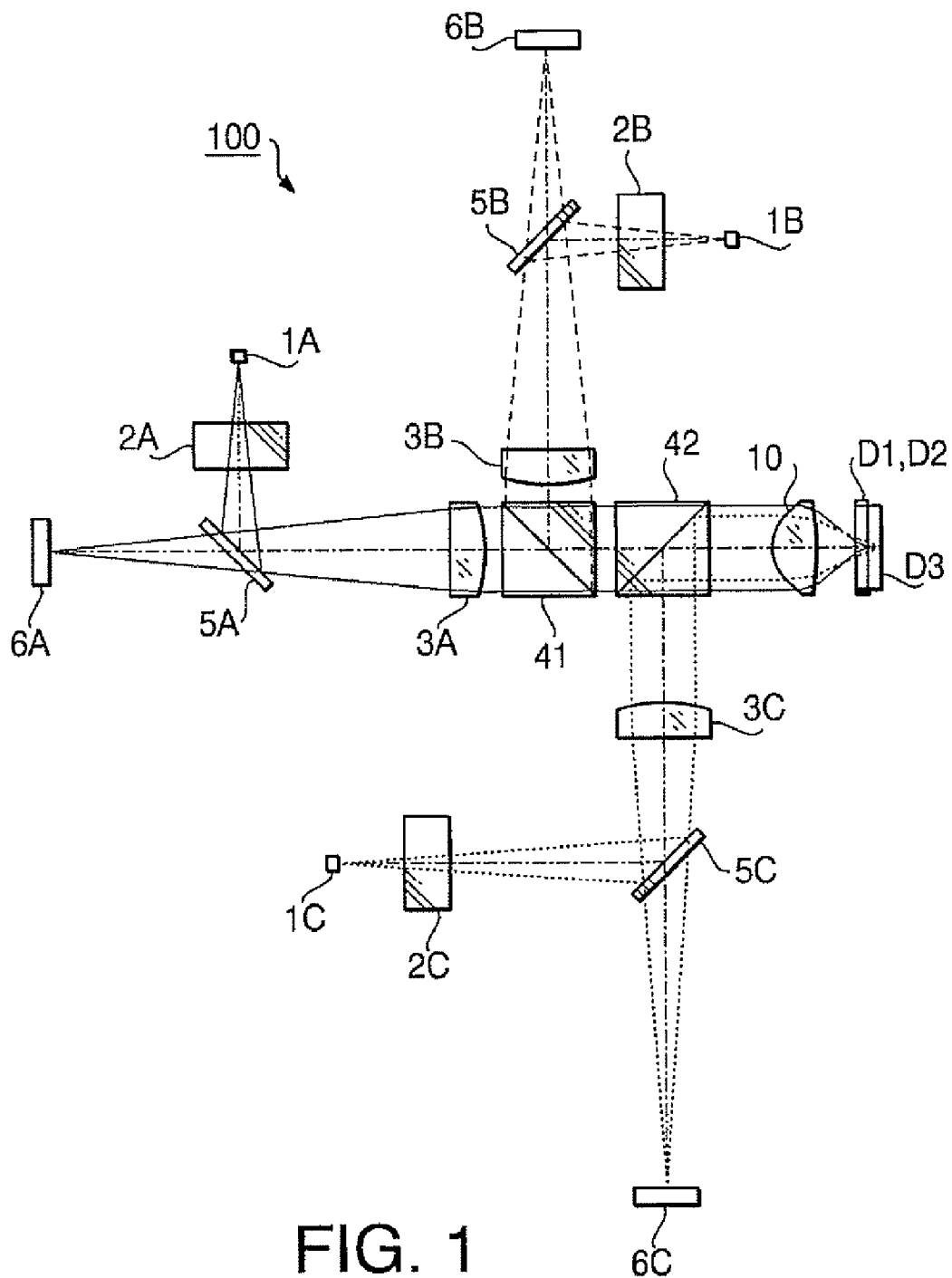
FIG. 1 is a block diagram of an optical disc drive including an objective lens according to a first embodiment of the invention.

FIG. 1 is a block diagram of an optical disc drive 100 including an objective lens 10 according to a first embodiment of the invention. As shown in FIG. 1, the optical disc drive 100 includes a light source 1A which emits the first laser beam, a light source 1B which emits the second laser beam, a third light source 1C which emits the third laser beam, diffraction gratings 2A, 2B and 2C, coupling lenses 3A, 3B and 3C, beam splitters 41 and 42, half mirrors 5A, 5B and 5C, and photoreceptors 6A, 68 and 6C. In order to change the size of a numerical aperture in accordance with the type of an optical disc being used, the optical disc drive 100 may be configured to have an aperture stop defining a beam size of each of the first to third laser beams.

As shown in FIG. 1, the first laser beam emitted by the light source 1A is directed to the objective lens 10 via a common optical path after passing through the coupling lens 3A and the beam splitters 41 and 42, the second laser beam emitted by the light source 11 is directed to the objective lens 10 via the common optical path after passing through the coupling lens 3B and the beam splitters 41 and 42, and the third laser beam emitted by the light source 1C is directed to the objective lens 10 via the common optical path after passing through the coupling lens 3C and the beam splitter 42. The first to third laser beams returning from a recording surface of an optical disc being used are detected by the photoreceptors 6a, 6B and 6C after passing through the half mirrors SA, 5B and 5C, respectively.

FIG. 2A is a partial optical block diagram of the optical disc drive 100 illustrating an optical system (an optical path) for the optical disc D1, FIG. 2B is a partial optical block diagram of the optical disc drive 100 illustrating an optical system (an optical path) for the optical disc D2, and FIG. 2C is a partial optical block diagram of the optical disc drive 100 illustrating an optical system (an optical path) for the optical disc D3. In each of FIGS. 2A, 2B and 2C, a reference axis AX of the optical disc drive 100 is represented by a chain line. Although each of FIGS. 2A to 2C represents a state where an optical axis of the objective lens 10 coincides with the reference axis AX, there is a case where the optical axis of the objective lens 10 shifts from the reference axis AX, for example, by a tracking operation. Such a relationship between the optical axis of the objective lens 10 and the reference axis AX also applies to representation of an optical system in a second embodiment.

The objective lens 10 has a surface 11 located on a light source side and a surface 12 located on an optical disc side. The objective lens 10 is a single element lens made of plastic.

Each of the surfaces 11 and 12 of the objective lens 10 is an aspherical surface. The aspherical surface is expressed by a following equation (3):

$$X(h) = \frac{ch^2}{1+\sqrt{1-(1+K)c^2h^2}} + A_4h^4 + A_6h^6 + A_8h^8 + A_{10}h^{10} + A_{12}h^{12} + \cdots \quad (3)$$

where, X(h) represents a SAG amount which is a distance between a point on the aspherical surface at a height of h from the optical axis and a plane tangential to the aspherical surface at the optical axis, symbol c represents curvature (1/r) on the optical axis, K is a conical coefficient, and $A_4, A_6, A_8, A_{10}$ and $A_{12}$ are aspherical coefficients of fourth, sixth, eighth, tenth and twelfth orders, respectively.

Reference numbers 21 and 22 respectively represent a cover layer and a recording surface of each of the optical discs D1, D2 and D3. Practically, the recording surface 22 is sandwiched between the cover layer 21 and a substrate layer or a label layer (not shown).

If laser beams having different wavelengths are used for the optical discs D1 to D3, spherical aberration changes due to change of a refractive index of the objective lens 10 and the difference of thicknesses of cover layers of the optical discs D1 to D3. In order to support the optical discs D1 to D3, the optical disc drive 100 is required to compensate for spherical aberration for each of the optical discs D1 to D3. For this reason, a step structure (hereafter, referred to as a phase shift structure), including minute steps formed between adjacent refractive surface zones concentrically formed about the reference axis, is formed on at least one of the surfaces 11 and 12 of the objective lens 10. That is, in this embodiment, the surface 11 of the objective lens 10 is divided into a plurality of concentric refractive surface zones. Each step functions to give an optical path length difference for a beam impinging thereon.

Figure 3:
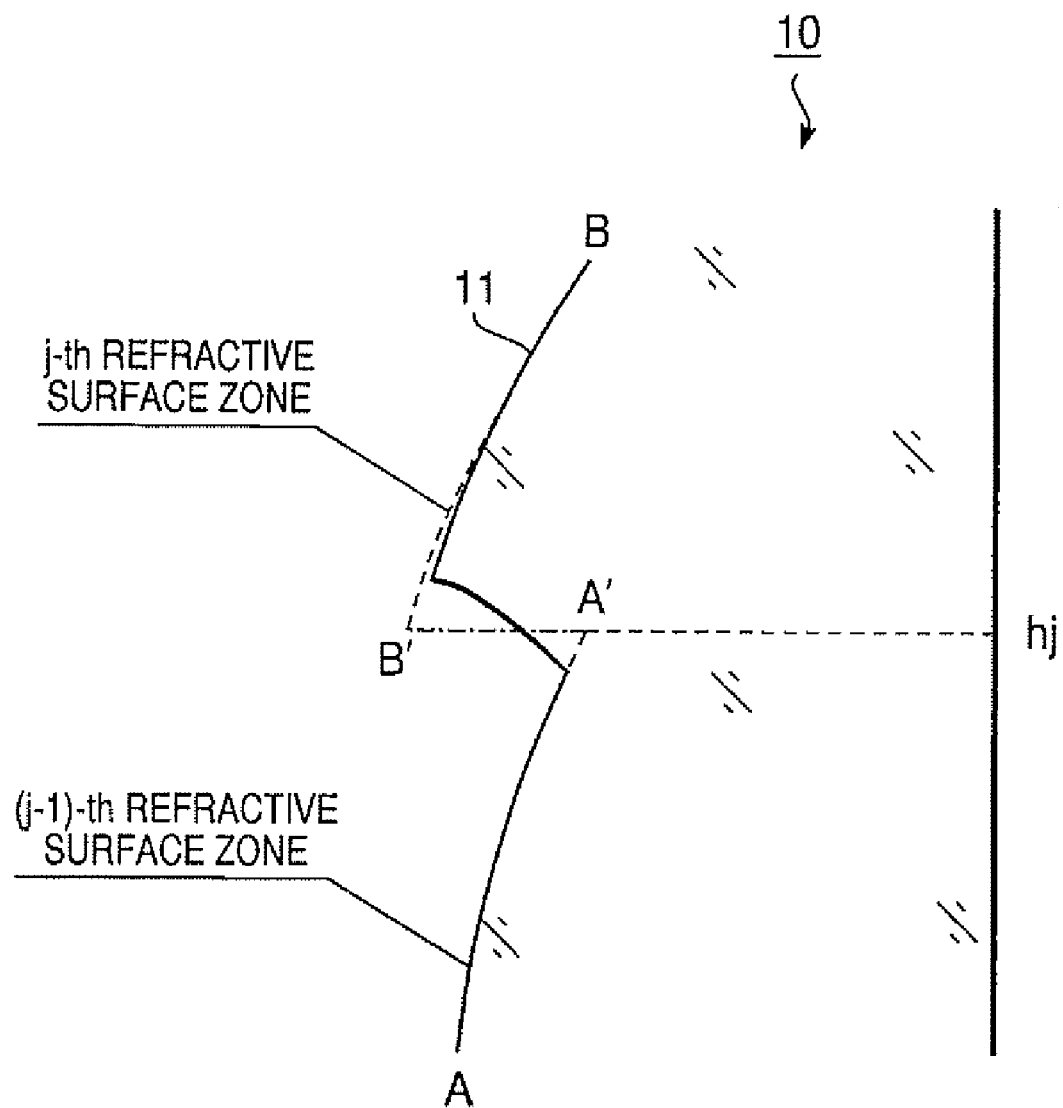
FIG. 3 is a partial cross section of the objective lens illustrating an enlarged view of a phase shift structure.

FIG. 3 is a partial cross section of the objective lens 10 illustrating an enlarged view of the phase shift structure. An optical path length difference means a difference between an optical path length determined by evaluating, to an image plane, light which is refracted at a boundary position hj by a hypothetical extended surface (an A-A' surface) obtained by extending the j-1)-th refractive surface in a direction deviating from the optical axis and an optical path length determined by evaluating, to an image plane, light which is refracted at a boundary position hj by a hypothetical extended surface (an B-B' surface) obtained by extending the j-th refractive surface in a direction approaching to the optical axis.

The phase shift structure shown in FIG. 3 is configured to have a property of controlling the spherical aberration caused in a refractive lens part of the objective lens 10 by a difference between the wavelengths of the first and second laser beams. In this embodiment, the phase shift structure has steps, each of which gives an optical path length difference substantially equal to an odd multiple of a wavelength of the first laser beam to the first laser beam in a region (hereafter, referred to as a first region) which is configured as an innermost region including an optical axis of the objective lens 10 and is configured to contribute to convergence of the third laser beam (i.e., to contribute to convergence of each of the first to third laser beams).

More specifically, the optical path length difference (substantially equal to an odd multiple of a wavelength of the first laser beam) given by each step of the phase shift structure is defined by a condition:

$$2N+0.70 < |\Delta OPD/\lambda 1| < 2N+1.30 \quad (1)$$

where λ1 represents the wavelength of the first laser beam, ΔOPD [nm] represents an optical path length difference given by a step to the first laser beam, and N represents an integer.

By satisfying the condition (1), it is possible to suitably perform the recording or reproducing operation for the optical discs D1 and D2 having relatively high recording densities. If |ΔOPD/λ1| gets larger than the upper limit of the condition (1), the diffraction efficiency of the first laser beam decreases. If |ΔOPD/λ1| gets lower than the lower limit of the condition (1), the diffraction efficiency of the second laser beam decreases.

The phase shift structure satisfying the condition (1) is expressed by an optical path difference function φ(h):

$$\phi(h) = (P_2h^2 + P_4h^4 + P_8h^8 + P_{10}h^{10} + P_{12}h^{12})m\lambda \quad (2)$$

where $P_2$, $P_4$ and $P_6$ ... are coefficients of second, fourth, sixth ... orders, h represents a height from the optical axis, m represents a diffraction order at which the diffraction efficiency is maximized, and λ represents a working wavelength of a laser beam being used. The optical path difference function φ(h) represents the function of the objective lens 10 as a diffraction lens by an additional optical path length.

In this embodiment, the phase shift structure is configured such that a value of differentiation of the optical path difference function φ(h) changes from a plus value to a minus value (i.e., crosses zero) in a height h ranging from 30% to 70% of an effective diameter of the first region. More specifically, the phase shift structure is configured to satisfy a following condition (3):

$$0.00 < (f1 \times P_2)/(t3-t1) < 18.00 \quad (3)$$

where f1 represents a focal length of the objective lens 10 defined when the first laser beam is used.

Figure 4A:
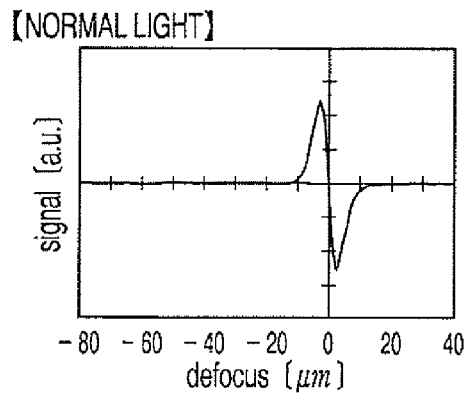
FIG. 4A shows a focus error signal component obtained from a normal beam of a diffraction order used for the third optical disc when a comparative objective lens not satisfying a condition required in an embodiment is used.
Figure 4B:
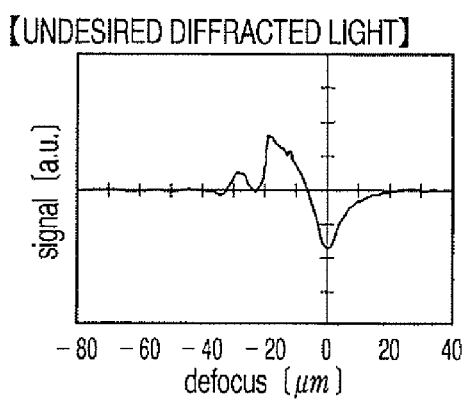
FIG. 4B shows a focus error signal component obtained from undesired diffraction order light when the comparative objective lens is used.
Figure 4C:
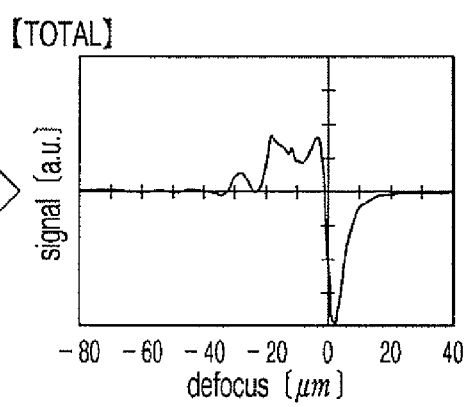
FIG. 4C shows a focus error signal obtained by summing both of the components shown in FIGS. 4A and 4B.
Figure 5A:
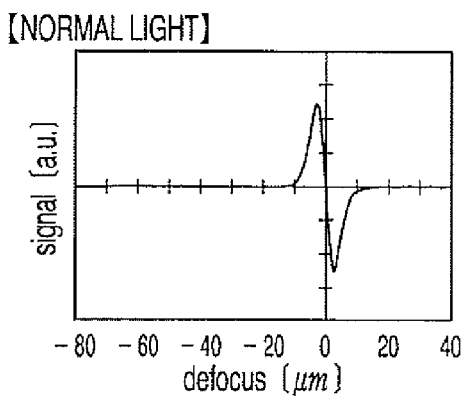
FIG. 5A shows a focus error signal component obtained from a normal beam of a diffraction order used for the third optical disc when the objective lens according to the embodiment is used.
Figure 5B:
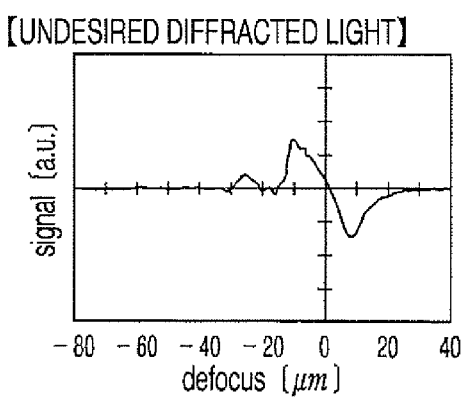
FIG. 5B shows a focus error signal component obtained from undesired diffraction order light when the objective lens according to the embodiment is used.
Figure 5C:
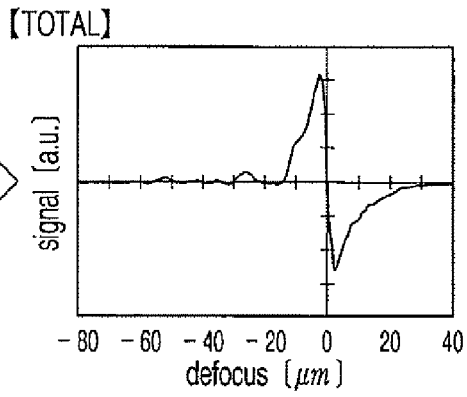
FIG. 5C shows a focus error signal obtained by summing both of the components shown in FIGS. 5A and 5B.

The condition (3) is explained with reference to FIGS. 4A to 4C and 5A to 5C. FIGS. 5A, 5B and 5C represent a focus error signal obtained in the recording or reproducing operation for the optical disc D3 performed in the optical disc drive 100 by using the objective lens 10 satisfying the condition (3). By contrast, if the objective lens 10 does not satisfy the condition (3), a focus error signal shown in FIGS. 4A, 4B and 4C is obtained. That is, FIGS. 4A, 4B and 4C represent a focus error signal obtained in the recording or reproducing operation for the optical disc D3 performed in an optical disc drive by using an objective lens not satisfying the condition (3).

More specifically, FIG. 5A shows a focus error signal component obtained from light (hereafter, referred to as normal diffraction order light) corresponding to a diffraction order used for the recording and reproducing operations for the optical disc D3, FIG. 5B shows a focus error signal component obtained from (hereafter, referred to as undesired diffraction order light) corresponding to a diffraction order not used for the recording and reproducing operations for the optical disc D3, and FIG. 5C shows a focus error signal obtained by summing both of the components shown in FIGS. 5A and 5B. As a comparative example, FIG. 4A shows a focus error signal component obtained from normal diffraction order light generated when the objective lens 10 does not satisfies the condition (3), FIG. 4B shows a focus error signal component obtained from undesired diffraction order light generated when the objective lens 10 does not satisfies the condition (3), and FIG. 4C shows a focus error signal obtained by summing both of the components shown in FIGS. 4A and 4B.

In each of FIGS. 4A to 4C and 5A to 5C (and in the following similar drawings regarding a focus error signal), a vertical axis represents a level of a focus error signal, and a horizontal axis represents a defocus amount of the objective lens.

As shown in FIGS. 4A to 4C, when the condition (3) is not satisfied (i.e., (f1×P$_2$)/(t3−t1) exceeds the upper limit or the lower limit of the condition (3)), a zero crossing point of the focus error signal component corresponding to the normal beam (see FIG. 4A) deviates from a zero crossing point of the focus error signal component corresponding to the undesired diffraction order light (see FIG. 4B). In this case, as shown in FIG. 4C, a waveform of the focus error signal formed as a total of the components shown in FIGS. 4A and 4B is deformed (see FIG. 4C).

By contrast, the objective lens 10 according to the embodiment satisfies the condition (3). Therefore, it is possible to keep a zero crossing point of the focus error signal component corresponding to the normal beam (see FIG. 5A) at a point near to a zero crossing point of the focus error signal component corresponding to the undesired diffraction order light (see FIG. 5B). Therefore, as shown in FIG. 5C, a suitable waveform of the focus error signal formed in the shape of the letter S enabling the optical disc drive 100 to effectively perform the focus error function can be obtained.

In order to obtain a focus error signal having a more excellent waveform, the objective lens 10 may satisfy a following condition:

$$2.50<(f1\times P_2)/(t3-t1)<13.00 \qquad (4).$$

More specifically, if Abbe number vd of the objective lens 10 satisfies a following condition (5):

$$40 \leq vd \leq 80 \qquad (5),$$

the phase shift structure of the objective lens 10 is configured such that the optical path length difference ΔOPD given to the first laser beam by each step of the phase shift structure satisfies a following condition:

$$2.70<|\Delta OPD/\lambda 1|<3.30 \qquad (6).$$

In this embodiment, the phase shift structure may satisfy a following condition:

$$1.32<|\Delta OPDC/\lambda 3|<1.62 \qquad (12)$$

where ΔOPDC (nm) represents an optical path length difference given to the third laser beam by each step between the annular zones.

If |ΔOPD/λ1| gets larger than the upper limit of the condition (6), the light amount of the first laser beam is lowered. If |ΔOPD/λ1| gets smaller than the lower limit of the condition (6), the light amount of undesired diffraction order light for the third laser beam increases, and thereby the focusing performance is lowered.

As described above, in a normal state the objective lens 10 is located on the reference axis AX in the optical disc drive 100. However, there is a case where the objective lens 10 shifts from the reference axis AX in the recording or reproducing operation by the tracking operation (tracking shift). In this case, if non-collimated light is incident on the objective lens 10, off-axis aberrations such as a coma or astigmatism may be caused although no off-axis aberration is caused as long as collimated light is incident on the objective lens 10.

In general, tolerance to aberrations becomes lower as the NA for recordation or reproduction of information for an optical disc increases. Therefore, for the suppression of off-axis aberrations which may be caused during the tracing shift, it is desired to configure an optical system so that a collimated light beam (or a substantially collimated light beam) is incident on an objective lens when an optical disc drive requiring a relatively high NA is used. For example, if the objective lens 10 satisfies the condition (6), the objective lens 10 is configured to satisfy following conditions:

$$-0.02<f1\times M1<0.02 \qquad (7)$$

$$-0.02<f2\times M2<0.02 \qquad (8)$$

where f1 and M1 respectively represent a focal length and magnification of the objective lens 10 when the optical disc D1 is used, and if and M2 respectively represent a focal length and magnification of the objective lens 10 when the optical disc D2 is used.

By configuring the objective lens 10 to satisfy the conditions (7) and (8), the laser beam becomes a substantially collimated beam when the optical disc D1 or D2 is used. Such a configuration makes it possible to decrease the amount of aberration, such as a coma and astigmatism caused during the tracking shift, to a negligible level. In this embodiment, the first and second laser beams emitted by the light sources 1A and 1B are converted to the collimated beams by the coupling lenses 3A and 3B, respectively, so that the magnification M1 and M2 is set for zero. In other words, each of the coupling lenses 3A and 3B functions as a collimator lens.

Since the objective lens 10 is configured to have the phase shift structure capable of suppressing the aberrations caused when each of the optical discs D1 and D2 is used, a spherical aberration may remain when the optical disc D3 is used. The spherical aberration caused when the optical disc 3S is used is compensated by generating a diverging beam as a beam to be incident on the objective lens 10 as shown in FIG. 2C. More specifically, the objective lens 10 is configured to satisfy a following condition (9) when the optical disc D3 is used:

$$-0.12<f1\times M3<-0.04 \qquad (9)$$

where f3 and M3 represent a focal length and magnification of the objective lens 10 when the optical disc D3 is used. If f3×M3 gets larger than the upper limit of the condition (9), an overcorrected spherical aberration remains. If f3×M3 gets lower than the lower limit of the condition (9), an undercorrected spherical aberration remains. By configuring the objective lens 10 to satisfy the condition (9), the spherical aberration caused when the optical disc D3 is used can be suitably suppressed.

If the phase shift structure of the objective lens 10 is configured such that the optical path length difference given by each step to the first laser beam is substantially equal to a triple of the wavelength of the first laser beam, a relative amount of spherical aberration caused due to the difference between thicknesses of the cover layers of the optical discs D1 and D3 can be reduced to some extent. Therefore, it is possible to decrease a diverging angle of the third laser beam incident on the objective lens 10 in comparison with the case where the optical path length difference caused by each step substantially equal to 2K multiple (where K is an integer) of the wavelength of the first laser beam.

If Abbe number vd of the objective lens 10 satisfies a following condition (10):

$$20 \leq vd<40 \qquad (10),$$

the phase shift structure of the objective lens 10 may be configured such that the optical path length difference ΔOPD given by each step to the first laser beam satisfies the condition (6). As described above, it is desired to configure the optical disc drive such that the collimated beam is incident on the objective lens 10 when an optical disc requiring a relatively high NA is used. Therefore, the objective lens 10 is configured to satisfy the conditions (7) and (8).

In order to suitably compensate for the spherical aberration caused when the optical disc D3 is used, the objective lens 10 satisfying the condition (10) is configured to satisfy a following condition (11).

$$-0.38 < f3 \times M3 < -0.30 \tag{11}$$

As described above, according to the embodiment, the phase shift structure configured such that a value of differentiation of the optical path difference function $\phi(h)$ crosses zero in a height h ranging from 30% to 70% of an effective diameter of the first region is used. Therefore, it is possible to prevent the waveform of the focus error signal from being deformed when the optical disc D3 is used, and to keep the focusing performance at a high level.

By configuring the objective lens 10 depending on Abbe number vd, it is possible to form a beam spot suitable for recordation and reproduction of information in the vicinity of the recording surface of each of the optical discs D1 to D3 by converging the first to third laser beams via the coupling lenses 3A to 3C, the beam splitters 41 and 42 and the objective lens 10.

The phase shift structure may additionally include a second region which is formed outside the first region configured as above and is configured to converge the first and second laser beams on the recording surfaces of the optical discs D1 and D2, respectively, and not to contribute to converging the third laser beam. In this case, the second region gives at least an optical path length difference to an incident beam at each step formed between adjacent refractive surface zones. An absolute value of an optical path length difference given by each step in the second region is different from an absolute value of an optical path length difference given by each step in the first region.

Second Embodiment

Hereafter, an optical disc drive 100B employing an objective lens 101B according to a second embodiment of the invention is described. Since the optical disc drive 100B according to the second embodiment has substantially the same structure as that of the first embodiment shown in FIG. 1, explanation of the entire structure of the optical disc drive 100B will not be repeated.

Figure 6A:
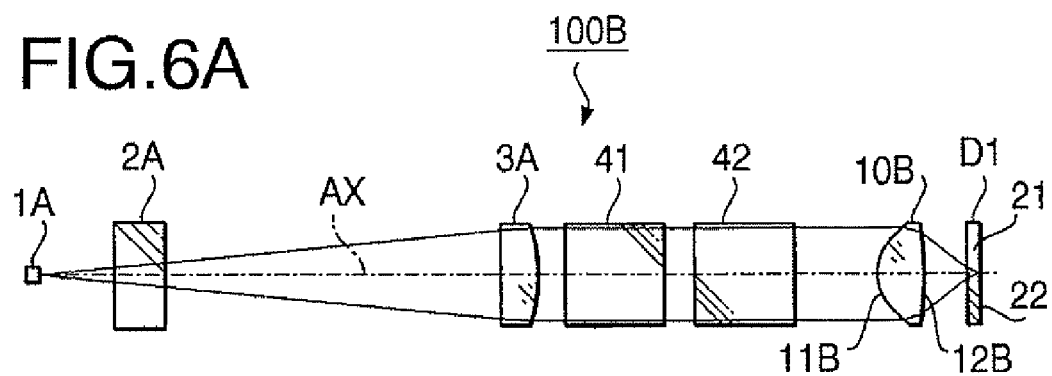
FIG. 6A is a partial optical block diagram of an optical disc drive according to a second embodiment illustrating an optical system for the first optical disc D1.
Figure 6B:
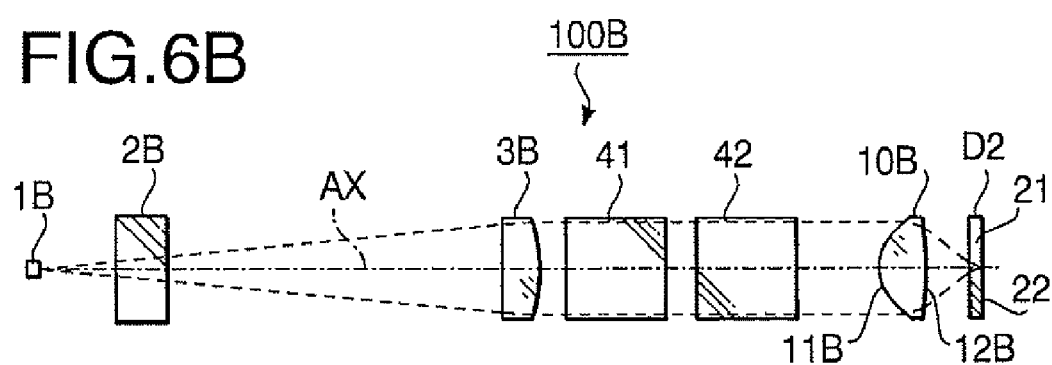
FIG. 6B is a partial optical block diagram of the optical disc drive according to the second embodiment illustrating an optical system for the third optical disc.
Figure 6C:
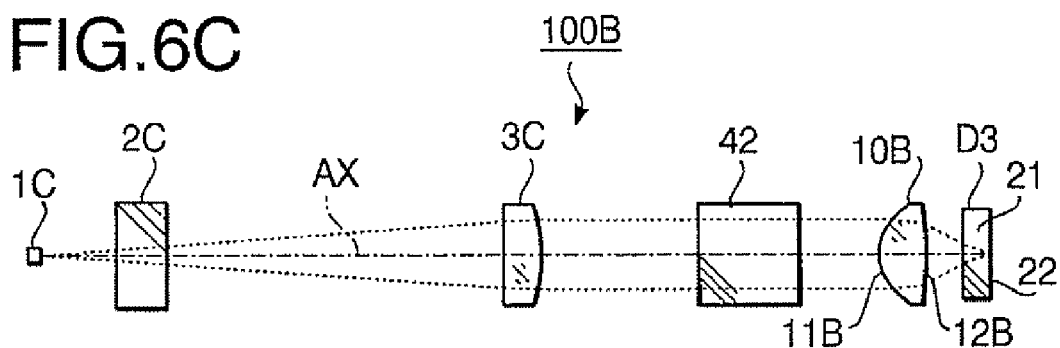
FIG. 6C is a partial optical block diagram of the optical disc drive according to the second embodiment illustrating an optical system for the third optical disc.

FIG. 6A is a partial optical block diagram of the optical disc drive l00B illustrating an optical system (an optical path) for the optical disc D1, FIG. 6B is a partial optical block diagram of the optical disc drive 100B illustrating an optical system (an optical path) for the optical disc D2, and FIG. 6C is a partial optical block diagram of the optical disc drive 100B illustrating an optical system (an optical path) for the optical disc D3. In FIGS. 6A to 6C, to elements which are the same as those of the first embodiment, the same reference numbers are assigned and explanations thereof will not be repeated. Similarly to FIGS. 2A to 2C, the reference axis AX of the optical disc drive 100B is represented by a chain line.

In the second embodiment, the light sources 1A to 1C and the coupling lenses 3A to 3C are located such that the first to third laser beams are converted to the collimated beams by the coupling lenses 3A to 3C, respectively. By this configuration, the magnification of the objective lens is substantially equal to zero for each of the optical discs D1 to D3. In other words, each of the coupling lenses 3A to 3C functions as a collimator lens.

In this embodiment, a phase shift structure is formed on at least one of surfaces 11B and 12B of the objective lens 10B. The phase shift structure is configured to be capable of adjusting the spherical aberration, which are caused depending on change of a refractive index of the objective lens 10 due to the difference between wavelengths of the first to third laser beams and on the difference between thicknesses of the cover layers of the optical discs D1 to D3, to approximately zero. In this embodiment, the phase shift structure has at least two types of steps respectively giving different optical path length differences to an incident beam.

The phase shift structure described above can be defined by two types of optical path difference functions. More specifically, if the two types of optical difference functions are represented as first and second optical path difference functions, a ratio of diffraction orders (at which the first to third laser beams take respective maximum diffraction efficiencies) defined by the first optical path difference function is different from a ratio of diffraction orders (at which the first to third laser beams take respective maximum diffraction efficiencies) defined by the second optical path difference function.

The optical path difference function defining the phase shift structure is expressed by a following equation (13):

$$\phi i(h) = (P_2 i h^2 + P_4 i h^4 + P_6 i h^6 + P_8 i h^8 + P_{10} i h^{10} + P_{12} i h^{12}) m \lambda \tag{14}$$

where $\phi i(h)$ represents an i-th optical path difference function (i: an integer), $P_2 i$, $P_4 i$ and $P_6 i$ . . . are coefficients of second, fourth, sixth . . . orders of the i-th optical path difference function, h represents a height from the optical axis, m represents a diffraction order at which the diffraction efficiency is maximized, and $\lambda$ represents a working wavelength of a laser beam being used. The optical path difference function $\phi(h)$ represents the function of the objective lens 10B as a diffraction lens by an additional optical path length.

The phase shift structure in the first region is configured such that a value of differentiation obtained from the first optical path difference function $\phi 1(h)$ changes from a plus value to a minus value (i.e., crosses zero) when the first laser beam is used and the height h is within the effective diameter. More specifically, the phase shift structure is configured to satisfy a following condition (15), and may be configured to further satisfy a following condition (16).

$$0.00 < (f1 \times P_2 1)/(t3 - t1) < 18.00 \tag{15}$$

$$2.50 < (f1 \times P_2 1)/(t3 - t1) < 13.00 \tag{16}$$

By satisfying the condition (15) or (16), the same advantages as those explained with reference to FIGS. 4A to 4C and 5A to 5C are achieved.

As described above, the phase shift structure is capable of controlling the spherical aberration caused in a refraction lens part of the objective lens 10 due to the difference between the wavelengths of the first and second laser beams. In other words, the phase shift structure according to the second embodiment has a step which gives an optical path length difference substantially equal to an odd multiple of the wavelength of the first laser beam, to the first laser beam.

More specifically, the optical path length difference equal to the odd multiple of the wavelength of the first laser beam is defined by a following condition:

$$2N + 0.70 < |\Delta OPD1/\lambda 1| < 2N + 1.30 \tag{13}$$

where $\lambda 1$ (nm) represents the wavelength of the first laser beam, and $\Delta OPD1$ (nm) represents an optical path length difference given by a step of the first type to the first laser beam.

By satisfying the condition (13) (more specifically, by satisfying a following condition (17) or (19), an optical path length difference ΔOPD1 given by at least one of steps of the first and second types to the first laser beam becomes substantially equal to a (2J+1) multiple of the wavelength of the first laser beam. In this case, the light amount may decreases when the optical disc D3 is used, For this reason, a step which gives an optical path length difference different from the optical path length difference ΔOPD1 is configured to increase the light amount of the third laser beam when the optical disc D3 is used. Specifically, the phase shift structure is configured such that an optical path length difference ΔOPD2 given by a step (which gives an optical path length difference different from the ΔOPD1) to the first laser beam satisfies a following condition (21), and more specifically the ΔOPD2 satisfies a following condition (22).

$$2L-0.20<|\Delta OPD2/\lambda 1|<2L+0.20 \qquad (21)$$

$$1.80<|\Delta OPD2/\lambda 1|<2.20 \qquad (22)$$

By satisfying the condition (21) or (22), it is possible to increase the light amount on the recording surface 22 when the optical disc D3 is used, while keeping the diffraction efficiency at a high level for the first or second laser beam.

If N is set for 1 in the condition (13), the optical path length difference may satisfy a condition:

$$2.70<|\Delta OPD1/\lambda 1|<3.30 \qquad (17).$$

Steps satisfying the condition (17) are configured to satisfy a condition:

$$1.32<|\Delta OPDC1/\lambda 3|<1.62 \qquad (18)$$

where OPDC1 (nm) represents an optical path length difference given by the phase shift structure in the first region to the third laser beam.

If N is set for 3 in the condition (13), the optical path length difference may satisfy a condition:

$$4.70<|\Delta OPD1/\lambda 1|<5.30 \qquad (19).$$

Steps satisfying the condition (19) are configured to satisfy a condition:

$$2.30<|\Delta OPDC1/\lambda 3|<2.60 \qquad (20)$$

where OPDC1 (nm) represents an optical path length difference given by the phase shift structure in the first region to the third light beam. By satisfying the condition (18) or (19), the diffraction efficiency of the normal diffraction order light of the third laser beam becomes higher than that of the undesired diffraction order light of the third laser beam.

The step structure may additionally includes a second region which is formed outside a first region configured as above and is configured to converge the first and second laser beams on the recording surfaces of the optical discs D1 and D2, respectively, and not to contribute to converging the third laser beam. In this case, the second region gives at least an optical path length difference to an incident beam at each step formed between adjacent refractive surface zones. An absolute value of an optical path length difference given by each step in the second region is different from the |ΔOPD1/λ1|.

According to the embodiment, even if the first to third laser beams are respectively converted to collimated beams for the optical discs D1 to D3, it is possible to suitably suppress a coma and astigmatism caused during the tracking shift, while suppressing the spherical aberration caused when each of the optical discs D1 to D3 is used. It is also possible to keep the focusing performance at an appropriate level while suppressing generation of undesired diffraction order light when the optical disc D3 is used.

In the above mentioned embodiments, if the optical disc drive satisfies a condition:

$$f1\times NA1>f2\times NA2 \qquad (23),$$

the phase shift structure may include a third region which is formed outside the second region and is configured to converge only the first light beam on the recording surface of the first optical disc and not to contribute to converging the second and third light beams. In this case, the third region gives at least an optical path length difference to an incident beam at each step formed between adjacent refractive surface zones. An absolute value of an optical path length difference given by each step in the third region is different from an absolute value of an optical path length difference given by each step in the second region.

In the above mentioned embodiments, if the optical disc drive may satisfy a condition:

$$f1\times NA1<f2\times NA2 \qquad (24),$$

the phase shift structure may include a third region which is formed outside the second region and is configured to converge only the second light beam on the recording surface of the second optical disc and not to contribute to converging the first and third light beams. In this case, the third region gives at least an optical path length difference to an incident beam at each step formed between adjacent refractive surface zones. An absolute value of an optical path length difference given by each step in the third region is different from an absolute value of an optical path length difference given by each step in the second region.

Hereafter, three concrete (first, second, and third) examples of the optical disc drive 100 employing the objective lens 10 according to the first embodiment and four concrete (fourth, fifth, sixth and seventh) examples of the optical disc drive 100B employing the objective lens 10B according to the second embodiment are described. The configuration of the first to third examples according to the first embodiment are explained with reference to FIGS. 1 and 2A to 2C, and the configuration of the fourth to seventh examples according to the second embodiment are explained with reference to FIGS. 6A to 6C. In each of the first to fourth examples, an aperture stop is used to achieve a suitable numerical aperture for the optical disc D3. For this reason, as shown in FIGS. 2A to 2C, the effective beam diameter becomes smaller when the optical disc D3 is used in comparison with the case where the optical disc D1 or D2 is used.

In the following examples, it is assumed that the thicknesses t1, t2 and t3 of the cover layers of the optical discs D1, D2 and D3 are as follows.

t1=0.6 mm t2=0.6 mm t3=1.2 mm

FIRST EXAMPLE

The objective lens 10 according to the first example is provided with the phase shift structure having steps producing a single type of optical path length difference. The phase shift structure is formed on the surface 1I of the objective lens 10. Specifications of the objective lens 10 according to the first example are shown in Table 1.

TABLE 1

|  | First laser beam | Second laser beam | Third laser beam |
|---|---|---|---|
| Design wavelength (nm) | 405 | 660 | 790 |
| Focal length f (mm) | 3.00 | 3.11 | 3.13 |
| NA | 0.65 | 0.63 | 0.50 |
| magnification | 0.000 | 0.000 | −0.026 |

In Table 1 (and in the following similar Tables), the design wavelength is a wavelength suitable for the recording/reproducing operation of the optical disc, f represents a focal length (unit: mm) of the objective lens 10, NA represents the numerical aperture. In Table 1, the performance specifications are indicated with regard to each of the first laser beam (the optical disc D1), the second laser beam (the optical disc D2) and the third laser beam (the optical disc D3).

As shown by values of the magnification in Table 1, each of the first and second laser beams is incident on the objective lens 10 as a collimated beam when each of the optical discs D1 and D2 is used. When the optical disc D3 is used, the third laser beam is incident on the objective lens 10 as a diverging beam.

Table 2 shows a numerical configuration of the optical disc drive 100 when the optical disc D1 (the first laser beam) is used, Table 3 shows a numerical configuration of the optical disc drive 100 when the optical disc D2 (the second laser beam) is used, and Table 4 shows a numerical configuration of the optical disc drive 100 when the optical disc D3 (the third laser beam) is used.

TABLE 2

| Surface Number | r | d | n (405 nm) | comments |
|---|---|---|---|---|
| #0 |  | 2.81 |  | light source |
| #1 | ∞ | 2.00 | 1.52972 | diffraction grating |
| #2 | ∞ | 13.00 |  |  |
| #3 | 85.710 | 1.50 | 1.52469 | coupling lens |
| #4 | −10.550 | 1.00 |  |  |
| #5 | ∞ | 4.00 | 1.52972 | beam splitter |
| #6 | ∞ | 1.00 |  |  |
| #7 | ∞ | 4.00 | 1.52972 | beam splitter |
| #8 | ∞ | 3.08 |  |  |
| #9 | 1.849 | 1.90 | 1.52469 | objective lens |
| #10 | −6.552 | 1.58 |  |  |
| #11 | ∞ | 0.60 | 1.62231 | optical disc |
| #12 | ∞ | — |  |  |

TABLE 3

| Surface Number | r | d | n (660 nm) | comments |
|---|---|---|---|---|
| #0 |  | 2.79 |  | light source |
| #1 | ∞ | 2.00 | 1.51374 | diffraction grating |
| #2 | ∞ | 13.00 |  |  |
| #3 | 101.820 | 1.50 | 1.54044 | coupling lens |
| #4 | −10.700 | 1.00 |  |  |
| #5 | ∞ | 4.00 | 1.51374 | beam splitter |
| #6 | ∞ | 1.00 |  |  |
| #7 | ∞ | 4.00 | 1.51374 | beam splitter |
| #8 | ∞ | 3.00 |  |  |

TABLE 3-continued

| Surface Number | r | d | n (660 nm) | comments |
|---|---|---|---|---|
| #9 | 1.849 | 1.90 | 1.50635 | objective lens |
| #10 | −6.552 | 1.66 |  |  |
| #11 | ∞ | 0.60 | 1.57961 | optical disc |
| #12 | ∞ | — |  |  |

TABLE 4

| Surface Number | r | d | n (790 nm) | comments |
|---|---|---|---|---|
| #0 |  | 2.98 |  | light source |
| #1 | ∞ | 2.00 | 1.51052 | diffraction grating |
| #2 | ∞ | 15.00 |  |  |
| #3 | −129.100 | 1.50 | 1.53653 | coupling lens |
| #4 | −12.200 | 5.09 |  |  |
| #5 | ∞ | 4.00 | 1.51052 | beam splitter |
| #6 | ∞ | 3.28 |  |  |
| #7 | 1.849 | 1.90 | 1.50313 | objective lens |
| #8 | −6.552 | 1.38 |  |  |
| #9 | ∞ | 1.20 | 1.57307 | optical disc |
| #10 | ∞ | — |  |  |

In Tables 2-4 (and in the following similar Tables), "r" represents a radius of curvature (unit: mm) of each lens surface on the optical axis, "d" represents a thickness of a lens or a distance (unit: mm) from a lens surface to a next lens surface, and "n" represents a refractive index.

In Tables 2 to 4 (and in the following similar tables), "surface number" represents a surface number of each surface of optical components in the optical pick-up 100. In Tables 2 to 4, surfaces #0 represents the light source 1A, 1B and 1C, respectively, #1 and #2 represent the diffraction gratings 2A, 2B and 2C, respectively, and surfaces #3 and #4 represent the coupling lenses 3A, 3B and 3C, respectively. In Tables 2 and 3, surfaces #5 and #6 represent the beam splitter 41, surfaces #7 and #8 represent the beam splitter 42, surfaces #9 and #10 represent the surfaces 11 and 12 of the objective lens 10, and surfaces #11 and #12 represent the cover layer 21 and the recording surface 22 of the optical discs D1 and D2, respectively. In Table 4, surfaces #5 and #6 represent the beam splitter 42, surfaces #7 and #8 represent the surfaces 11 and 12 of the objective lens 10, and surfaces #9 and #10 represent the cover layer 21 and the recording surface 22 of the optical discs D1 and D2, respectively.

A second surface of each of the coupling lenses 3A to 3C is an aspherical surface. Each of the surfaces 11 and 12 of the objective lens 10 is an aspherical surface. Table 5 shows the conical coefficient and aspherical coefficients of the aspherical surfaces defined when the optical disc D1 is used. Table 6 shows the conical coefficient and aspherical coefficients of the aspherical surfaces defined when the optical disc D2 is used. Table 7 shows the conical coefficient and aspherical coefficients of the aspherical surfaces defined when the optical disc D3 is used. In Tables 5 to 7 (and in the following similar Tables), a notation symbol E indicates that 10 is used as a radix and a right side value of E is used as an exponent.

TABLE 5

| SURFACE NO. | K | A4 | A6 | A8 | A10 | A12 |
|---|---|---|---|---|---|---|
| 4 | 0.0000 | 7.8520E−05 | 5.3350E−07 | 0.0000E+00 | 0.0000E+00 | 0.0000E+00 |
| 9 | −0.7000 | 2.1720E−03 | 3.4820E−04 | −5.8470E−05 | −3.7780E−05 | 3.3290E−06 |
| 10 | 0.0000 | 2.3660E−02 | −8.5750E−03 | 2.1640E−03 | −3.1100E−04 | 1.9410E−05 |

TABLE 6

| SURFACE NO. | K | A4 | A6 | A8 | A10 | A12 |
|---|---|---|---|---|---|---|
| 4 | 0.0000 | 7.3130E−05 | 4.8300E−07 | 0.0000E+00 | 0.0000E+00 | 0.0000E+00 |
| 9 | −0.7000 | 2.1720E−03 | 3.4820E−04 | −5.8470E−05 | −3.7780E−05 | 3.3290E−06 |
| 10 | 0.0000 | 2.3660E−02 | −8.5750E−03 | 2.1640E−03 | −3.1100E−04 | 1.9410E−05 |

TABLE 7

| SURFACE NO. | K | A4 | A6 | A8 | A10 | A12 |
|---|---|---|---|---|---|---|
| 4 | 0.0000 | 2.5840E−05 | 1.5260E−07 | 0.0000E+00 | 0.0000E+00 | 0.0000E+00 |
| 7 | −0.7000 | 2.1720E−03 | 3.4820E−04 | −5.8470E−05 | −3.7780E−05 | 3.3290E−06 |
| 8 | 0.0000 | 2.3660E−02 | −8.5750E−03 | 2.1640E−03 | −3.1100E−04 | 1.9410E−05 |

Table 8 shows values of the coefficients ($P_2$ . . . ) of the optical path difference function applied to the phase shift structure formed on the surface 11 of the objective lens 10.

TABLE 8

| | $P_2$ | $P_4$ | $P_6$ | $P_8$ | $P_{10}$ | $P_{12}$ |
|---|---|---|---|---|---|---|
| (surface 11) | 1.0000E+00 | −7.4830E−01 | 6.4280E−02 | −3.3700E−02 | 0.0000E+00 | 0.0000E+00 |

Table 9 shows the diffraction order m for each of the first to third laser beams.

TABLE 9

| | first laser beam | second laser beam | third laser beam |
|---|---|---|---|
| diffraction order m | 3 | 2 | 2 |

As can be seen from Tables 1 and 8, each of the terms of the conditions (3) and (4) (i.e., (f1×$P_2$)/(t3−t1)) is 5.00. Therefore, the first example satisfies the conditions (3) and (4).

Table 10 shows in detail the configuration of the phase shift structure formed on the surface 11 of the objective lens 10. In Table 10, a height range of each annular zone and a value the optical path length difference |ΔOPD/λ1| given to the first laser beam passing through each annular zone are shown. In Table 10 (and the following similar tables), numbers are assigned to annular zones in order of increasing distance from the optical axis, and the height range of each annular zone is represented by a minimum height hmin and a maximum height hmax of each annular zone. In Table 10 (and in the following similar tables), ΔOPDC [nm] represents an optical path length difference given to the third laser beam by each step between the adjacent annular zones.

TABLE 10

| Number of annular zone | hmin | hmax | |ΔOPD/λ1| | |ΔOPDC/λ3| |
|---|---|---|---|---|
| 0 | 0.000 | 1.320 | | |
| 1 | 1.320 | 1.480 | 3.00 | 1.49 |
| 2 | 1.480 | 1.582 | 3.00 | 1.49 |
| 3 | 1.582 | 1.658 | 3.00 | 1.49 |
| 4 | 1.658 | 1.720 | 3.00 | 1.49 |
| 5 | 1.720 | 1.771 | 3.00 | 1.49 |
| 6 | 1.771 | 1.815 | 3.00 | 1.49 |
| 7 | 1.815 | 1.854 | 3.00 | 1.49 |

TABLE 10-continued

| Number of annular zone | hmin | hmax | |ΔOPD/λ1| | |ΔOPDC/λ3| |
|---|---|---|---|---|
| 8 | 1.854 | 1.889 | 3.00 | 1.49 |
| 9 | 1.889 | 1.920 | 3.00 | 1.49 |
| 10 | 1.920 | 1.950 | 3.00 | 1.49 |

Since Abbe number vd of the objective lens 10 of the first example is 58, the condition (5) is satisfied. As shown in Table 10, the optical path length difference |ΔOPD/λ1| given by each step between adjacent annular zones to the first laser beam is 3.00 (i.e., N=1). Therefore, conditions (1) and (6) are satisfied. As can be seen from Table 10, |ΔOPDC/λ3| is 1.49. Therefore, the condition (12) is satisfied.

Table 11 shows a numerical configuration of an optical system configured in the optical disc drive 100 to detect a focus error signal when the optical disc D3 is used.

TABLE 11

| surface No. | r | d | n(790 nm) | comments |
|---|---|---|---|---|
| 11 | ∞ | 1.20 | 1.57307 | optical disc |
| 12 | ∞ | 1.38 | | |
| 13 | 6.552 | 1.90 | 1.50313 | objective lens |
| 14 | −1.849 | 3.28 | | |
| 15 | ∞ | 4.00 | 1.51052 | beam splitter |
| 16 | ∞ | 5.09 | | |
| 17 | 12.200 | 1.50 | 1.53653 | coupling lens |
| 18 | 129.100 | 9.00 | | |
| 19 | ∞ | 2.18 | 1.51052 | half mirror |
| 20 | ∞ | 9.89 | | |
| 21 | ∞ | — | | photoreceptor |

In Table 11, surfaces #11 and #12 represent the cover layer and the recording surface of the optical disc D3, surfaces #13 and #14 represent the objective lens 10, surfaces #15 and #16 represent the beam splitter 42, surfaces #17 and #18 represent the coupling lens 3C, surfaces #19 and #20 represent the half mirror 5C, and surface #21 represents the photoreceptor 6C.

Figure 7:
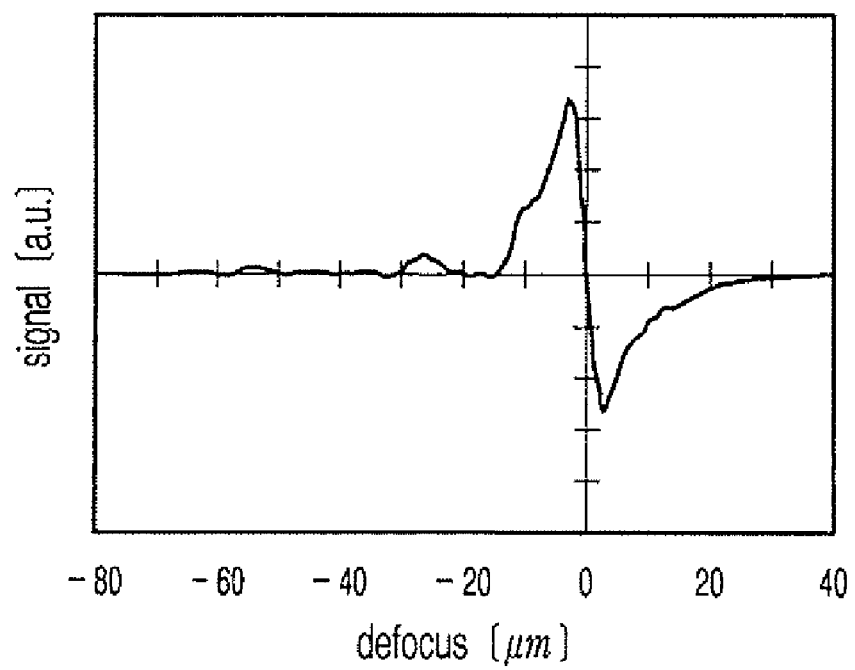
FIG. 7 illustrates a focus error signal detected by a photoreceptor when the third optical disc is used in an optical disc drive according to a first example.

FIG. 7 illustrates a focus error signal detected by the photoreceptor 6C when the optical disc P3 is used in the optical disc drive 100. As a comparative example, FIG. 8 illustrates a focus error signal formed by an objective lens configured to have the same configuration as the objective lens 10 with the exception of the terms of the conditions (3) and (4) taking a value of 0.00.

Figure 8:
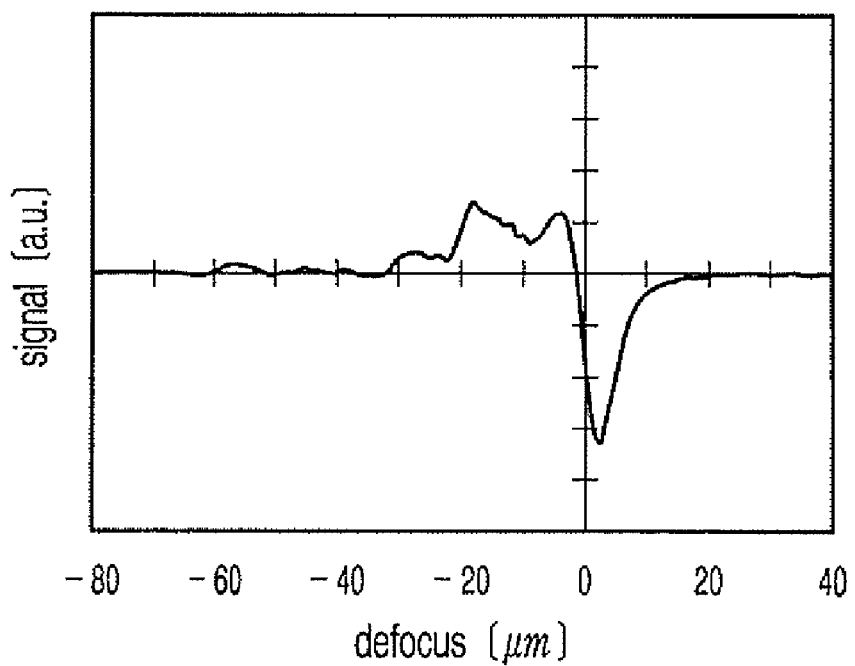
FIG. 8 illustrates a focus error signal formed by an objective lens according to a comparative example.

As can be seen from the comparison between FIGS. 7 and 8, the focus error signal detected by the photoreceptor 6C of the first example has a more suitable waveform formed in the shape of the letter S than the waveform shown in FIG. 8. By satisfying the conditions (3) and (4), the optical disc drive 100 according to the first example is able to prevent deformation of the focus error signal and thereby suitably suppress the deterioration of the focusing performance.

As can be seen from Table 1, in the optical disc drive 100 according to the first example, f1×M1 is 0.000, f2×M2 is 0.000, and f3×M3 is −0.081. Therefore, the conditions (7), (8) and (9) are satisfied.

Figure 9A:
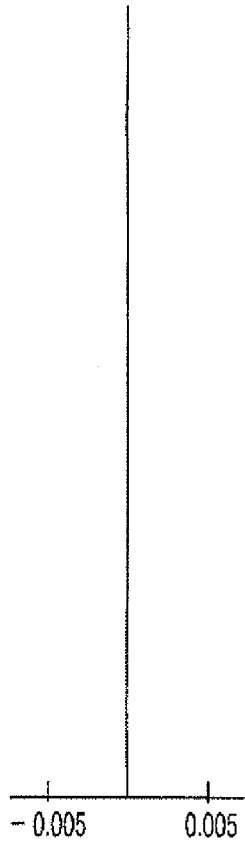
FIG. 9A is a graph illustrating spherical aberration caused when a first laser beam for the first optical disc is used in the optical disc drive according to the first example.
Figure 9B:
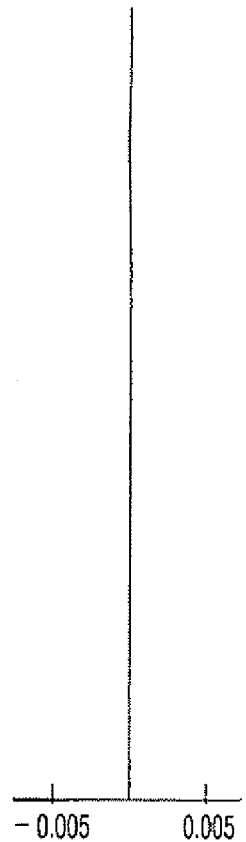
FIG. 9B is a graph illustrating the spherical aberration caused when a second laser beam for the second optical disc is used in the optical disc drive according to the first example.
Figure 9C:
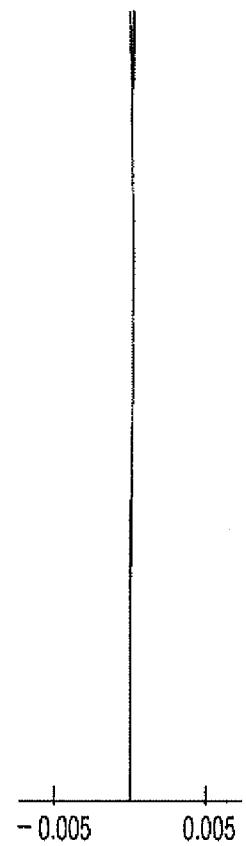
FIG. 9C is a graph illustrating the spherical aberration caused when a third laser beam for the third optical disc is used in the optical disc drive according to the first example.

FIG. 9A is a graph illustrating the spherical aberration caused when the first laser beam is used in the optical disc drive 100 according to the first example. FIG. 9B is a graph illustrating the spherical aberration caused when the second laser beam is used in the optical disc drive 100 according to the first example. FIG. 9C is a graph illustrating the spherical aberration caused when the third laser beam is used in the optical disc drive 100 according to the first example. As shown in FIGS. 9A to 9C, the spherical aberration is suitably compensated and a suitable beam spot is formed for each of the optical discs D1 to D3.

SECOND EXAMPLE

The objective lens 10 according to the second example is provided with the phase shift structure having steps producing a single type of optical path length difference. The phase shift structure is formed on the surface 11 of the objective lens 10. Specifications of the objective lens 10 according to the second example are shown in Table 12.

TABLE 12

|  | First laser beam | Second laser beam | Third laser beam |
|---|---|---|---|
| Design wavelength (nm) | 405 | 660 | 790 |
| Focal length f (mm) | 3.00 | 3.11 | 3.13 |
| NA | 0.65 | 0.63 | 0.46 |
| magnification | 0.000 | 0.000 | −0.025 |

As shown by values of the magnification in Table 12, each of the first and second laser beams is incident on the objective lens 10 as a collimated beam when each of the optical discs D1 and D2 is used. When the optical disc D3 is used, the third laser beam is incident on the objective lens 10 as a diverging beam.

Table 13 shows a numerical configuration of the optical disc drive 100 when the optical disc D1 (the first laser beam) is used, Table 14 shows a numerical configuration of the optical disc drive 100 when the optical disc D2 (the second laser beam) is used, and Table 15 shows a numerical configuration of the optical disc drive 100 when the optical disc D3 (the third laser beam) is used.

TABLE 13

| Surface Number | r | d | n (405 nm) | comments |
|---|---|---|---|---|
| #0 |  | 2.81 |  | light source |
| #1 | ∞ | 2.00 | 1.52972 | diffraction grating |
| #2 | ∞ | 13.00 |  |  |
| #3 | 85.710 | 1.50 | 1.52469 | coupling lens |
| #4 | −10.550 | 1.00 |  |  |
| #5 | ∞ | 4.00 | 1.52972 | beam splitter |
| #6 | ∞ | 1.00 |  |  |
| #7 | ∞ | 4.00 | 1.52972 | beam splitter |
| #8 | ∞ | 3.09 |  |  |
| #9 | 1.850 | 2.20 | 1.52469 | objective lens |
| #10 | −5.747 | 1.42 |  |  |
| #11 | ∞ | 0.60 | 1.62231 | optical disc |
| #12 | ∞ | — |  |  |

TABLE 14

| Surface Number | r | d | n (660 nm) | comments |
|---|---|---|---|---|
| #0 |  | 2.79 |  | light source |
| #1 | ∞ | 2.00 | 1.51374 | diffraction grating |
| #2 | ∞ | 13.00 |  |  |
| #3 | 101.820 | 1.50 | 1.54044 | coupling lens |
| #4 | −10.700 | 1.00 |  |  |
| #5 | ∞ | 4.00 | 1.51374 | beam splitter |
| #6 | ∞ | 1.00 |  |  |
| #7 | ∞ | 4.00 | 1.51374 | beam splitter |
| #8 | ∞ | 3.00 |  |  |
| #9 | 1.850 | 2.20 | 1.50635 | objective lens |
| #10 | −5.747 | 1.51 |  |  |
| #11 | ∞ | 0.60 | 1.57961 | optical disc |
| #12 | ∞ | — |  |  |

TABLE 15

| Surface Number | r | d | n (790 nm) | comments |
|---|---|---|---|---|
| #0 |  | 3.15 |  | light source |
| #1 | ∞ | 2.00 | 1.51052 | diffraction grating |
| #2 | ∞ | 15.00 |  |  |
| #3 | −129.100 | 1.50 | 1.53653 | coupling lens |
| #4 | −12.200 | 4.95 |  |  |
| #5 | ∞ | 4.00 | 1.51052 | beam splitter |
| #6 | ∞ | 3.28 |  |  |
| #7 | 1.850 | 2.20 | 1.50313 | objective lens |
| #8 | −5.747 | 1.23 |  |  |
| #9 | ∞ | 1.20 | 1.57307 | optical disc |
| #10 | ∞ | — |  |  |

A second surface of each of the coupling lenses 3A to 3C is an aspherical surface, surfaces 11 and 12 of the objective lens 10 is an aspherical surface. Table 16 shows coefficient and aspherical coefficients of the aspherical surfaces defined when the optical disc D1 is used. Table 17 shows the conical coefficient and aspherical coefficients of the aspherical surfaces defined when the optical disc D2 is used. Table 18 shows the conical coefficient and aspherical coefficients of the aspherical surfaces defined when the optical disc D3 is used.

TABLE 16

| SURFACE NO. | K | A4 | A6 | A8 | A10 | A12 |
|---|---|---|---|---|---|---|
| 4 | 0.0000 | 7.8520E−05 | 5.3350E−07 | 0.0000E+00 | 0.0000E+00 | 0.0000E+00 |
| 9 | −0.6000 | 5.3070E−04 | 2.4390E−04 | −6.6200E−06 | −7.9430E−06 | 3.1590E−06 |
| 10 | 0.0000 | 3.4360E−02 | −1.1760E−02 | 3.6750E−03 | −7.1647E−04 | 6.1600E−05 |

TABLE 17

| SURFACE NO. | K | A4 | A6 | A8 | A10 | A12 |
|---|---|---|---|---|---|---|
| 4 | 0.0000 | 7.3130E−05 | 4.8300E−07 | 0.0000E+00 | 0.0000E+00 | 0.0000E+00 |
| 9 | −0.6000 | 5.3070E−04 | 2.4390E−04 | −6.6200E−06 | −7.9430E−06 | 3.1590E−06 |
| 10 | 0.0000 | 3.4360E−02 | −1.1760E−02 | 3.6750E−03 | −7.1647E−04 | 6.1600E−05 |

TABLE 18

| SURFACE NO. | K | A4 | A6 | A8 | A10 | A12 |
|---|---|---|---|---|---|---|
| 4 | 0.0000 | 2.5840E−05 | 1.5260E−07 | 0.0000E+00 | 0.0000E+00 | 0.0000E+00 |
| 7 | −0.6000 | 5.3070E−04 | 2.4390E−04 | −6.6200E−06 | −7.9430E−06 | 3.1590E−06 |
| 8 | 0.0000 | 3.4360E−02 | −1.1760E−02 | 3.6750E−03 | −7.1647E−04 | 6.1600E−05 |

Table 19 shows values of the coefficients ($P_2$ . . . ) of the optical path difference function applied to the phase shift structure formed on the surface 11 of the objective lens 10.

TABLE 19

| | $P_2$ | $P_4$ | $P_6$ | $P_8$ | $P_{10}$ | $P_{12}$ |
|---|---|---|---|---|---|---|
| (surface 11) | 2.0000E+00 | −7.4510E−01 | −2.6640E−04 | −1.1760E−02 | 0.0000E+00 | 0.0000E+00 |

Table 20 shows the diffraction order m at which diffraction efficiency of each of the first to third laser beams takes a maximum value.

TABLE 20

| | first laser beam | second laser beam | third laser beam |
|---|---|---|---|
| diffraction order m | 3 | 2 | 2 |

As can be seen from Tables 12 and 19, each of the terms of the conditions (3) and (4) (i.e., (f1×$P_2$)/(t3−t1)) is 10.00. Therefore, the second example satisfies the conditions (3) and (4).

Table 21 shows in detail the configuration of the phase shift structure formed on the surface 11 of the objective lens 10. In Table 21, a height range of each annular zone and the optical path length difference |ΔOPD/λ1| given to the first laser beam passing through each annular zone are shown.

TABLE 21

| Number of annular zone | hmin | hmax | |ΔOPD/λ1| | |ΔOPD/λ3| |
|---|---|---|---|---|
| 0 | 0.000 | 0.528 | | |
| 1 | 0.528 | 1.486 | 3.00 | 1.49 |
| 2 | 1.486 | 1.626 | 3.00 | 1.49 |
| 3 | 1.626 | 1.719 | 3.00 | 1.49 |
| 4 | 1.719 | 1.791 | 3.00 | 1.49 |
| 5 | 1.791 | 1.850 | 3.00 | 1.49 |
| 6 | 1.850 | 1.900 | 3.00 | 1.49 |
| 7 | 1.900 | 1.950 | 3.00 | 1.49 |

Since Abbe number vd of the objective lens 10 of the second example is 58, the condition (5) is satisfied. As shown in Table 21, the optical path length difference |ΔOPD/λ1| given by each step between adjacent annular zones to the first laser beam is 3.00 (i.e., N=1). Therefore, conditions (1) and (6) are satisfied. As can be seen from Table 21, |ΔOPDC/λ3| is 1.49. Therefore, the condition (12) is satisfied.

Table 22 shows a numerical configuration of an optical system configured in the optical disc drive 100 to detect a focus error signal when the optical disc D3 is used.

TABLE 22

| surface No. | r | d | r(790 nm) | comments |
|---|---|---|---|---|
| 11 | ∞ | 1.20 | 1.57307 | optical disc |
| 12 | ∞ | 1.23 | | |
| 13 | 5.747 | 2.20 | 1.50313 | objective lens |
| 14 | −1.850 | 3.28 | | |
| 15 | ∞ | 4.00 | 1.51052 | beam splitter |
| 16 | ∞ | 4.95 | | |
| 17 | 12.200 | 1.50 | 1.53653 | coupling lens |
| 18 | 129.100 | 9.00 | | |
| 19 | ∞ | 2.20 | 1.51052 | half mirror |
| 20 | ∞ | 9.92 | | |
| 21 | ∞ | — | | photoreceptor |

In Table 22, surfaces #11 and #12 represent the cover layer and the recording surface of the optical disc D3, surfaces #13 and #14 represent the objective lens 10, surfaces #15 and #16 represent the beam splitter 42, surfaces #17 and #18 represent the coupling lens 3C, surfaces #19 and #20 represent the half mirror 5C, and surface #21 represents the photoreceptor 6C.

Figure 10:
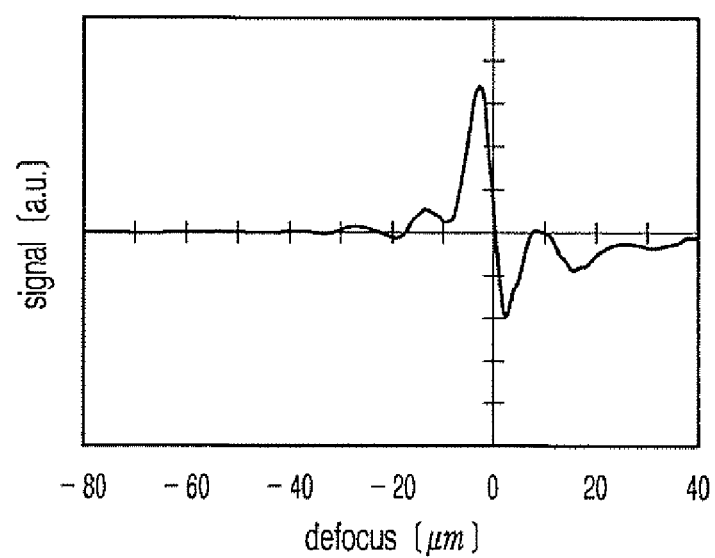
FIG. 10 illustrates a focus error signal detected by a photoreceptor when the third optical disc is used in the optical disc drive according to a second example.

FIG. 10 illustrates a focus error signal detected by the photoreceptor 6C when the optical disc D3 is used in the optical disc drive 100. As can be seen from FIG. 10, the focus error signal detected by the photoreceptor 6C of the second example has a suitable waveform formed in the shape of the letter S. By satisfying the conditions (3) and (4), the optical disc drive 100 according to the second example is able to prevent deformation of the focus error signal and thereby suitably suppress the deterioration of the focusing performance.

As can be seen from Table 12, in the optical disc drive 100 according to the second example, f1×M1 is 0.000, f2×M2 is 0.000, and f3×M3 is −0.081. Therefore, the conditions (7), (8) and (9) are satisfied.

Figure 11A:
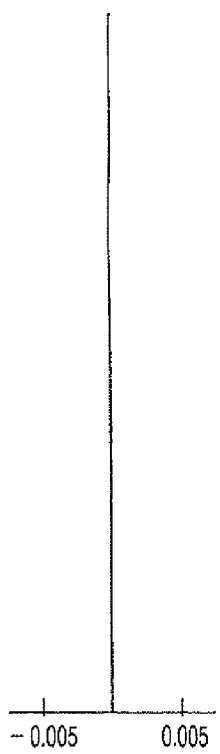
FIG. 11A is a graph illustrating spherical aberration caused when the first laser beam is used in the optical disc drive according to the second example.
Figure 11B:
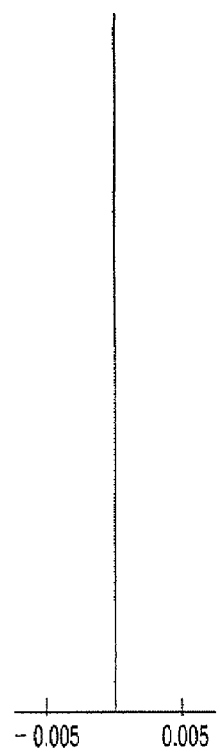
FIG. 11B is a graph illustrating the spherical aberration caused when the second laser beam is used in the optical disc drive according to the second example.
Figure 11C:
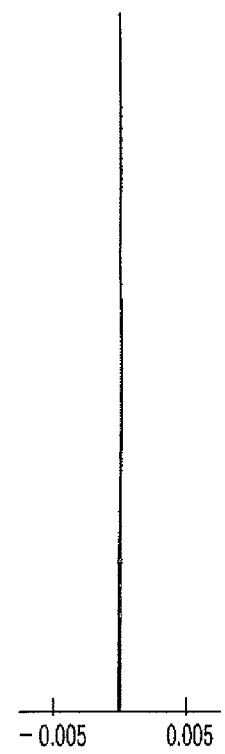
FIG. 11C is a graph illustrating the spherical aberration caused when the third laser beam is used in the optical disc drive according to the second example.

FIG. 11A is a graph illustrating the spherical aberration caused when the first laser beam is used in the optical disc drive 100 according to the second example. FIG. 11B is a graph illustrating the spherical aberration caused when the second laser beam is used in the optical disc drive 100 according to the second example. FIG. 11C is a graph illustrating the spherical aberration caused when the third laser beam is used in the optical disc drive 100 according to the second example. As shown in FIGS. 11A to 11C, the spherical aberration is suitably compensated and a suitable beam spot is formed for each of the optical discs D1 to D3.

THIRD EXAMPLE

The objective lens 10 according to the third example is provided with the phase shift structure having steps producing a single type of optical path length difference. The phase shift structure is formed on the surface 11 of the objective lens 10. Specifications of the objective lens 10 according to the first example are shown in Table 23.

TABLE 23

|  | First laser beam | Second laser beam | Third laser beam |
|---|---|---|---|
| Design wavelength (nm) | 408 | 660 | 790 |
| Focal length f (mm) | 2.25 | 2.33 | 2.35 |
| NA | 0.65 | 0.65 | 0.45 |
| magnification | 0.000 | 0.000 | −0.048 |

As shown by values of the magnification in Table 23, each of the first and second laser beams is incident on the objective lens 10 as a collimated beam when each of the optical discs D1 and 92 is used. When the optical disc D3 is used, the third laser beam is incident on the objective lens 10 as a diverging beam.

Table 24 shows a numerical configuration of the optical disc drive 100 when the optical disc D1 (the first laser beam) is used, Table 25 shows a numerical configuration of the optical disc drive 100 when the optical disc 92 (the second laser beam) is used, and Table 26 shows a numerical configuration of the optical disc drive 100 when the optical disc D3 (the third laser beam) is used.

In this example, the phase shift structure formed on the surface 11 ((#9) of the objective lens 10 is divided into three regions including the first to third regions. The first region is configured to converge the third laser beam on the recording surface of the optical disc D3. The second region, which is formed outside the first region, is configured to converge the first and second laser beams on the recording surfaces of the optical discs D1 and D2, respectively. The third region, which is formed outside the second region, is configured to converge only the second laser beam on the recording surface of the optical disc D1 and not to contribute to converging the first and third laser beams.

TABLE 24

| Surface Number | r | d | n (405 nm) | comments |
|---|---|---|---|---|
| #0 |  | 2.81 |  | light source |
| #1 | ∞ | 2.00 | 1.52934 | diffraction grating |
| #2 | ∞ | 13.00 |  |  |
| #3 | 85.020 | 1.50 | 1.52424 | coupling lens |
| #4 | −10.550 | 1.00 |  |  |

TABLE 24-continued

| Surface Number | r | d | n (405 nm) | comments |
|---|---|---|---|---|
| #5 | ∞ | 3.20 | 1.52934 | beam splitter |
| #6 | ∞ | 1.00 |  |  |
| #7 | ∞ | 3.20 | 1.52934 | beam splitter |
| #8 | ∞ | 3.06 |  |  |
| #9 (1st region) | 1.461 | 1.70 | 1.52424 | objective lens |
| #9 (2nd region) | 1.461 |  |  |  |
| #9 (3rd region) | 1.495 |  |  |  |
| #10 | −3.429 | 1.00 |  |  |
| #11 | ∞ | 0.60 | 1.62110 | optical disc |
| #12 | ∞ | — |  |  |

TABLE 25

| Surface Number | r | d | n (660 nm) | comments |
|---|---|---|---|---|
| #0 |  | 2.79 |  | light source |
| #1 | ∞ | 2.00 | 1.51374 | diffraction grating |
| #2 | ∞ | 13.00 |  |  |
| #3 | 101.820 | 1.50 | 1.54044 | coupling lens |
| #4 | −10.700 | 1.00 |  |  |
| #5 | ∞ | 3.20 | 1.51374 | beam splitter |
| #6 | ∞ | 1.00 |  |  |
| #7 | ∞ | 3.20 | 1.51374 | beam splitter |
| #8 | ∞ | 3.00 |  |  |
| #9 (1st region) | 1.461 | 1.70 | 1.50635 | objective lens |
| #9 (2nd region) | 1.461 |  |  |  |
| #9 (3rd region) | 1.495 |  |  |  |
| #10 | −3.429 | 1.06 |  |  |
| #11 | ∞ | 0.60 | 1.57961 | optical disc |
| #12 | ∞ | — |  |  |

TABLE 26

| Surface Number | r | d | n (790 nm) | comments |
|---|---|---|---|---|
| #0 |  | 4.50 |  | light source |
| #1 | ∞ | 2.00 | 1.51052 | diffraction grating |
| #2 | ∞ | 6.00 |  |  |
| #3 | −32.000 | 1.50 | 1.53653 | coupling lens |
| #4 | −7.982 | 5.06 |  |  |
| #5 | ∞ | 3.20 | 1.51052 | beam splitter |
| #6 | ∞ | 3.25 |  |  |
| #7 (1st region) | 1.461 | 1.70 | 1.50313 | objective lens |
| #7 (2nd region) | 1.461 |  |  |  |
| #7 (3rd region) | 1.495 |  |  |  |
| #8 | −3.429 | 0.81 |  |  |
| #9 | ∞ | 1.20 | 1.57307 | optical disc |
| #10 | ∞ | — |  |  |

A second surface of each of the coupling lenses 3A to 3C is an aspherical surface. Each of the surfaces 11 and 12 of the objective lens 10 is an aspherical surface. Table 27 shows the conical coefficient and aspherical coefficients of the aspherical surfaces defined when the optical disc D1 is used. Table 28 shows the conical coefficient and aspherical coefficients of the aspherical surfaces defined when the optical disc D2 is used. Table 29 shows the conical coefficient and aspherical coefficients of the aspherical surfaces defined when the optical disc D3 is used.

TABLE 27

| SURFACE NO. | K | A4 | A6 | A8 | A10 | A12 |
|---|---|---|---|---|---|---|
| 4 | 0.0000 | 7.8600E−05 | 5.4830E−07 | 0.0000E+00 | 0.0000E+00 | 0.0000E+00 |
| 9 (1st region) | −0.6500 | −1.5100E−03 | −2.4710E−03 | −2.5100E−04 | −4.7710E−05 | −2.3780E−06 |
| 9 (2nd region) | −0.6500 | −1.5700E−03 | −2.3010E−03 | −3.9490E−04 | −2.1790E−05 | 6.3950E−06 |
| 9 (3rd region) | −0.6500 | 1.1020E−03 | −1.5730E−03 | −1.1230E−04 | −4.6340E−05 | 7.6010E−07 |
| 10 | 0.0000 | 5.0000E−02 | −1.7570E−02 | 5.8280E−03 | −1.3110E−03 | 1.4330E−04 |

TABLE 28

| SURFACE NO. | K | A4 | A6 | A8 | A10 | A12 |
|---|---|---|---|---|---|---|
| 4 | 0.0000 | 7.3130E−05 | 4.8300E−07 | 0.0000E+00 | 0.0000E+00 | 0.0000E+00 |
| 9 (1st region) | −0.6500 | −1.5100E−03 | −2.4710E−03 | −2.5100E−04 | −4.7710E−05 | −2.3780E−06 |
| 9 (2nd region) | −0.6500 | −1.5700E−03 | −2.3010E−03 | −3.9490E−04 | −2.1790E−05 | 6.3950E−06 |
| 9 (3rd region) | −0.6500 | 1.1020E−03 | −1.5730E−03 | −1.1230E−04 | −4.6340E−05 | 7.6010E−07 |
| 10 | 0.0000 | 5.0000E−02 | −1.7570E−02 | 5.8280E−03 | −1.3110E−03 | 1.4330E−04 |

TABLE 29

| SURFACE NO. | K | A4 | A6 | A8 | A10 | A12 |
|---|---|---|---|---|---|---|
| 4 | 0.0000 | 4.5600E−05 | 7.8200E−07 | 0.0000E+00 | 0.0000E+00 | 0.0000E+00 |
| 7(1st region) | −0.6500 | −1.5100E−03 | −2.4710E−03 | −2.5100E−04 | −4.7710E−05 | −2.3780E−06 |
| 7(2nd region) | −0.6500 | −1.5700E−03 | −2.3010E−03 | −3.9490E−04 | −2.1790E−05 | 6.3950E−06 |
| 7(3rd region) | −0.6500 | 1.1020E−03 | −1.5730E−03 | −1.1230E−04 | −4.6340E−05 | 7.6010E−07 |
| 8 | 0.0000 | 5.0000E−02 | −1.7570E−02 | 5.8280E−03 | −1.3110E−03 | 1.4330E−04 |

Table 30 shows values of the coefficients ($P_2$ ... ) of the optical path difference function applied to the phase shift structure formed on the surface 11 of the objective lens 10. In this example, the optical path difference function is defined for each of the first to third region.

TABLE 30

| (surface 11) | $P_2$ | $P_4$ | $P_6$ | $P_8$ | $P_{10}$ | $P_{12}$ |
|---|---|---|---|---|---|---|
| 1st region | 2.9930E+00 | −8.6540E−01 | −8.0150E−01 | −1.3150E−02 | 0.0000E+00 | 0.0000E+00 |
| 2nd region | 2.9930E+00 | −8.9140E−01 | −7.2350E−01 | −8.8390E−02 | 2.3510E−02 | 0.0000E+00 |
| 3rd region | 1.4100E−02 | 0.0000E+00 | −1.0770E+00 | 0.0000E+00 | 0.0000E+00 | 0.0000E+00 |

Table 31 shows the diffraction order m at which diffraction efficiency of each of the first to third laser beams takes a maximum value. In Table 31, an effective radius (mm) of each of the first to third regions is shown.

TABLE 31

| (surface 11) | first laser beam | second laser beam | third laser beam | effective radius |
|---|---|---|---|---|
| 1st region | 3 | 2 | 2 | 1.100 |
| 2nd region | 3 | 2 | — | 1.460 |
| 3rd region | — | 1 | — | 1.510 |

Table 32 shows a numerical configuration of an optical system configured in the optical disc drive 100 to detect a focus error signal when the optical disc D3 is used.

TABLE 32

| surface No. | r | d | n(790 nm) | comments |
|---|---|---|---|---|
| 11 | ∞ | 1.20 | 1.57307 | optical disc |
| 12 | ∞ | 0.81 | | |
| 13 | 3.429 | 1.70 | 1.50313 | objective lens |
| 14 (1st region) | −1.461 | 3.25 | | |
| 14 (2nd region) | −1.461 | | | |
| 14 (3rd region) | −1.495 | | | |
| 15 | ∞ | 3.20 | 1.51052 | beam splitter |
| 16 | ∞ | 5.06 | | |
| 17 | 7.982 | 1.50 | 1.53653 | coupling lens |
| 18 | 32.000 | 5.00 | | |
| 19 | ∞ | 2.18 | 1.51052 | half mirror |
| 20 | ∞ | 6.30 | | |
| 21 | ∞ | — | | photoreceptor |

In Table 32, surfaces #11 and #12 represent the recording surface and the cover layer al disc D3, surfaces #13 and #14 represent the objective lens 10, surfaces #15 and #16 represent the beam splitter 42, surfaces #17 and #18 represent the coupling lens 3C, surfaces #19 and #20 represent the half mirror 5C, and surface #21 represents the photoreceptor 6C.

Table 33 shows in detail the configuration of the phase shift structure formed on the surface 11 of the objective lens 10. In Table 33, a height range of each annular zone and the optical path length differences $|\Delta OPD/\lambda 1|$, $|\Delta OPDd/\lambda 2|$, $|\Delta OPD/\lambda 3|$ respectively given to the first to third laser beams passing through each annular zone are shown.

TABLE 33

| Number of annular zone | region | hmin | hmax | $|\Delta OPD/\lambda 1|$ | $|\Delta OPDd/\lambda 2|$ | $|\Delta OPDC/\lambda 3|$ |
|---|---|---|---|---|---|---|
| 0 | 1 | 0.000 | 0.422 | | | |
| 1 | | 0.422 | 1.100 | 3.18 | 1.90 | 1.58 |
| 2 | 2 | 1.100 | 1.156 | 0.00 | 0.00 | 0.00 |
| 3 | | 1.156 | 1.245 | 3.00 | 1.79 | 1.49 |
| 4 | | 1.245 | 1.307 | 3.00 | 1.79 | 1.49 |
| 5 | | 1.307 | 1.355 | 3.00 | 1.79 | 1.49 |
| 6 | | 1.355 | 1.395 | 3.00 | 1.79 | 1.49 |
| 7 | | 1.395 | 1.430 | 3.00 | 1.79 | 1.49 |
| 8 | | 1.430 | 1.460 | 3.00 | 1.79 | 1.49 |
| 9 | 3 | 1.460 | 1.485 | | 1.00 | |
| 10 | | 1.485 | 1.510 | | 1.00 | |

In this example, $|\Delta OPD/\lambda 1|$ is 3.00, $(f*P2)/(t3-t1)$ is 11.22, vd is approximately 58, f1×M1 is 0.00, f2×M2 is 0.00, f3×M3 is −0.113, $|\Delta OPDC/\lambda 3|$ is 1.53, f1×NA1 is 1.46, and f2×NA2 is 1.51. Therefore, conditions (1), (3), (4), (7) to (10), (12) and (24) are satisfied.

FIG. 12 illustrates a focus error signal detected by the photoreceptor 6C when the optical disc D3 is used in the optical disc drive 100. As can be seen from FIG. 12, the focus error signal detected by the photoreceptor 6C of the third example has a suitable waveform formed in the shape of the letter S. By satisfying the conditions (3) and (4), the optical disc drive 100 according to the third example is able to prevent deformation of the focus error signal and thereby suitably suppress the deterioration of the focusing performance.

FIG. 13A is a graph illustrating the spherical aberration caused when the first laser beam is used in the optical disc drive 100 according to the third example. FIG. 13B is a graph illustrating the spherical aberration caused when the second laser beam is used in the optical disc drive 100 according to the third example. FIG. 13C is a graph illustrating the spherical aberration caused when the third laser beam is used in the optical disc drive 100 according to the third example. As shown in FIGS. 13A to 13C, the spherical aberration is suitably compensated and a suitable beam spot is formed for each of the optical discs D1 to D3.

FOURTH EXAMPLE

The objective lens 10B according to the fourth example is provided with the phase shift structure having steps producing two different optical path length differences. The phase shift structure is formed on the surface 11 B of the objective lens 10B. Specifications of the objective lens 10B according to the fourth example are shown in Table 34.

TABLE 34

| | First laser beam | Second laser beam | Third laser beam |
|---|---|---|---|
| Design wavelength (nm) | 405 | 660 | 790 |
| Focal length f (mm) | 3.00 | 3.10 | 3.12 |
| NA | 0.65 | 0.63 | 0.51 |
| magnification | 0.000 | 0.000 | 0.000 |

Table 35 shows a numerical configuration of the optical disc drive 100B when the optical disc D1 (the first laser beam) is used, Table 36 shows a numerical configuration of the optical disc drive 100B when the optical disc D2 (the second laser beam) is used, and Table 37 shows a numerical configuration of the optical disc drive 100B when the optical disc D3 (the third laser beam) is used.

TABLE 35

| Surface Number | r | d | n (405 nm) | Comments |
|---|---|---|---|---|
| #0 | | 2.81 | | light source |
| #1 | ∞ | 2.00 | 1.52972 | diffraction grating |
| #2 | ∞ | 13.00 | | |
| #3 | 85.710 | 1.50 | 1.52469 | coupling lens |
| #4 | −10.550 | 1.00 | | |
| #5 | ∞ | 4.00 | 1.52972 | beam splitter |
| #6 | ∞ | 1.00 | | |
| #7 | ∞ | 4.00 | 1.52972 | beam splitter |
| #8 | ∞ | 3.08 | | |
| #9 | 1.920 | 2.20 | 1.52469 | objective lens |
| #10 | −5.149 | 1.46 | | |
| #11 | ∞ | 0.60 | 1.62231 | optical disc |
| #12 | ∞ | — | | |

TABLE 36

| Surface Number | r | d | n (660 nm) | comments |
|---|---|---|---|---|
| #0 | | 2.79 | | light source |
| #1 | ∞ | 2.00 | 1.51374 | diffraction grating |
| #2 | ∞ | 13.00 | | |
| #3 | 101.820 | 1.50 | 1.54044 | coupling lens |
| #4 | −10.700 | 1.00 | | |
| #5 | ∞ | 4.00 | 1.51374 | beam splitter |
| #6 | ∞ | 1.00 | | |
| #7 | ∞ | 4.00 | 1.51374 | beam splitter |
| #8 | ∞ | 3.00 | | |
| #9 | 1.920 | 2.20 | 1.50635 | objective lens |
| #10 | −5.149 | 1.54 | | |
| #11 | ∞ | 0.60 | 1.57961 | optical disc |
| #12 | ∞ | — | | |

TABLE 37

| Surface Number | r | d | n (790 nm) | comments |
|---|---|---|---|---|
| #0 | | 2.80 | | light source |
| #1 | ∞ | 2.00 | 1.51052 | diffraction grating |
| #2 | ∞ | 13.00 | | |
| #3 | 94.270 | 1.50 | 1.53653 | coupling lens |
| #4 | −10.700 | 5.00 | | |
| #5 | ∞ | 4.00 | 1.51052 | beam splitter |
| #6 | ∞ | 3.36 | | |
| #7 | 1.920 | 2.20 | 1.50313 | objective lens |
| #8 | −5.149 | 1.18 | | |
| #9 | ∞ | 1.20 | 1.57307 | optical disc |
| #10 | ∞ | — | | |

A second surface of each of the coupling lenses 3A to 3C is an aspherical surface. Each of the surfaces 11 B and 12B of the objective lens 10B is an aspherical surface. Table 38 shows the conical coefficient and aspherical coefficients of the aspherical surfaces defined when the optical disc D1 is used. Table 39 shows the conical coefficient and aspherical coefficients of the aspherical surfaces defined when the optical disc D2 is used. Table 40 shows the conical coefficient and aspherical coefficients of the aspherical surfaces defined when the optical disc 13 is used.

As can be seen from Tables 34 and 41, each of the terms of the conditions (14) and (15)(i.e., $(f1 \times P_2 1)/(t3-t1)$) is 4.00. Therefore, the fourth example satisfies the conditions (14) and (15).

Table 43 shows in detail the configuration of the phase shift structure formed on the surface 11B of the objective lens 10B. In Table 43, a height range of each annular zone and the optical path length difference given to the first laser beam passing through each annular zone are shown.

TABLE 38

| SURFACE NO. | K | A4 | A6 | A8 | A10 | A12 |
|---|---|---|---|---|---|---|
| 4 | 0.0000 | 7.8520E−05 | 5.3350E−07 | 0.0000E+00 | 0.0000E+00 | 0.0000E+00 |
| 9 | −0.6000 | −3.0140E−03 | −5.3610E−04 | −1.6870E−05 | −2.3520E−06 | −1.4554E−06 |
| 10 | 0.0000 | 1.9320E−02 | −3.5590E−03 | 4.2570E−04 | −2.0200E−05 | −8.4590E−07 |

TABLE 39

| SURFACE NO. | K | A4 | A6 | A8 | A10 | A12 |
|---|---|---|---|---|---|---|
| 4 | 0.0000 | 7.3130E−05 | 4.8300E−07 | 0.0000E+00 | 0.0000E+00 | 0.0000E+00 |
| 9 | −0.6000 | −3.0140E−03 | −5.3610E−04 | −1.6870E−05 | −2.3520E−06 | −1.4554E−06 |
| 10 | 0.0000 | 1.9320E−02 | −3.5590E−03 | 4.2570E−04 | −2.0200E−05 | −8.4590E−07 |

TABLE 40

| SURFACE NO. | K | A4 | A6 | A8 | A10 | A12 |
|---|---|---|---|---|---|---|
| 4 | 0.0000 | 7.4370E−05 | 4.9000E−07 | 0.0000E+00 | 0.0000E+00 | 0.0000E+00 |
| 7 | −0.6000 | −3.0140E−03 | −5.3610E−04 | −1.6870E−05 | −2.3520E−06 | −1.4554E−06 |
| 8 | 0.0000 | 1.9320E−02 | −3.5590E−03 | 4.2570E−04 | −2.0200E−05 | −8.4590E−07 |

Table 41 shows values of the coefficients ($P_2 i \ldots$) of each of the optical path difference functions applied to the phase shift structure formed on the surface 11B of the lens 10B.

TABLE 41

| i | $P_2 i$ | $P_4 i$ | $P_6 i$ | $P_8 i$ | $P_{10} i$ | $P_{12} i$ |
|---|---|---|---|---|---|---|
| 1 | 8.0000E−01 | −8.5350E−01 | −1.4800E−01 | 4.0600E−03 | 0.0000E+00 | 0.0000E+00 |
| 2 | 0.0000E+00 | −5.3930E−01 | 3.7360E−02 | 2.9200E−03 | 0.0000E+00 | 0.0000E+00 |

Table 42 shows the diffraction order m at which diffraction efficiency of each of the first to third laser beams takes a maximum value. In Table 42, the diffraction orders m are shown for each of the two optical path difference functions.

TABLE 42

| i | first laser beam | second laser beam | third laser beam |
|---|---|---|---|
| 1 | 3 | 2 | 2 |
| 2 | 2 | 1 | 1 |

TABLE 43

| Number of annular zone | hmin | hmax | $|\Delta OPD1/\lambda 1|$ | $|\Delta OPD2/\lambda 1|$ | $|\Delta OPDC1/\lambda 3|$ |
|---|---|---|---|---|---|
| 0 | 0.000 | 1.001 | | | |
| 1 | 1.001 | 1.091 | | 2.00 | |
| 2 | 1.091 | 1.267 | 3.00 | | 1.49 |
| 3 | 1.267 | 1.342 | 3.00 | | 1.49 |
| 4 | 1.342 | 1.376 | | 2.00 | |
| 5 | 1.376 | 1.458 | 3.00 | | 1.49 |
| 6 | 1.458 | 1.525 | 3.00 | | 1.49 |
| 7 | 1.525 | 1.550 | 3.00 | | 1.49 |

TABLE 43-continued

| Number of annular zone | hmin | hmax | \|ΔOPD1/λ1\| | \|ΔOPD2/λ1\| | \|ΔOPDC1/λ3\| |
|---|---|---|---|---|---|
| 8 | 1.550 | 1.582 | | 2.00 | |
| 9 | 1.582 | 1.631 | 3.00 | | 1.49 |
| 10 | 1.631 | 1.675 | 3.00 | | 1.49 |
| 11 | 1.675 | 1.715 | 3.00 | | 1.49 |
| 12 | 1.715 | 1.752 | 3.00 | | 1.49 |
| 13 | 1.752 | 1.785 | 3.00 | 2.00 | 1.49 |
| 14 | 1.785 | 1.817 | 3.00 | | 1.49 |
| 15 | 1.817 | 1.846 | 3.00 | | 1.49 |
| 16 | 1.846 | 1.861 | 3.00 | | 1.49 |
| 17 | 1.861 | 1.874 | | 2.00 | |
| 18 | 1.874 | 1.900 | 3.00 | | 1.49 |
| 19 | 1.900 | 1.924 | 3.00 | | 1.49 |
| 20 | 1.924 | 1.950 | 3.00 | | 1.49 |

Since Abbe number vd of the objective lens 10B of the fourth example is 58, the condition (5) is satisfied. As shown in Table 43, the optical path length differences |ΔOPD1/λ1| and |ΔOPD2/λ1| given by each step between adjacent annular zones to the first laser beam are 3.00 and 2.00, respectively (i.e., N=1 in the condition (13) and L=1 in the condition (21)). Therefore, conditions (13), (21) and (22) are satisfied. As can be seen from Table 43, |ΔOPDC1/λ3| is 1.49. Therefore, the condition (18) is satisfied.

Table 44 shows a numerical configuration of an optical system configured in the optical disc drive 100B to detect a focus error signal when the optical disc D3 is used.

TABLE 44

| surface No. | r | d | n(790 nm) | comments |
|---|---|---|---|---|
| 11 | ∞ | 1.20 | 1.57307 | optical disc |
| 12 | ∞ | 1.18 | | |
| 13 | 5.149 | 2.20 | 1.50313 | objective lens |
| 14 | −1.920 | 3.36 | | |
| 15 | ∞ | 4.00 | 1.51052 | beam splitter |
| 16 | ∞ | 5.00 | | |
| 17 | 10.700 | 1.50 | 1.53653 | coupling lens |
| 18 | −94.270 | 9.00 | | |
| 19 | ∞ | 2.20 | 1.51052 | half mirror |
| 20 | ∞ | 7.59 | | |
| 21 | ∞ | — | | photoreceptor |

In Table 44, surfaces #11 and #12 represent the cover layer and the recording surface of the optical disc D3, surfaces #13 and #14 represent the objective lens 10, surfaces #15 and #16 represent the beam splitter 42, surfaces #17 and #18 represent the coupling lens 3C, surfaces #19 and #20 represent the half mirror 5C, and surface #21 represents the photoreceptor 6C.

FIG. 14 illustrates a focus error signal detected by the photoreceptor 6C when the optical disc D3 is used in the optical disc drive 100B. As can be seen from FIG. 14, the focus error signal detected by the photoreceptor 6C of the fourth example has a suitable waveform formed in the shape of the letter S. By satisfying the conditions (15) and (16), the optical disc drive 100B according to the fourth example is able to prevent deformation of the focus error signal and thereby suitably suppress the deterioration of the focusing performance.

As can be seen from Table 34 and FIGS 6A to 6C, in the optical disc drive 100B according to the fourth example, f1×M1 is 0.000, f2×M2 is 0.000, and f3×M3 is 0.00. Therefore, it is possible to prevent occurrence of the spherical aberration in the tracking operation for each of the optical discs D1 to D3.

FIG. 15A is a graph illustrating the spherical aberration caused when the first laser beam is used in the optical disc drive 100B according to the fourth example. FIG. 15B is a graph illustrating the spherical aberration caused when the second laser beam is used in the optical disc drive 100B according to the fourth example. FIG. 15C is a graph illustrating the spherical aberration caused when the third laser beam is used in the optical disc drive 100B according to the fourth example. As shown in FIGS. 15A to 15C, the spherical aberration is suitably compensated and a suitable beam spot is formed for each of the optical discs D1 to D3.

FIFTH EXAMPLE

The objective lens 10B according to the fifth example is provided with the phase shift structure having steps producing two different optical path length differences. The phase shift structure is formed on the surface 11B of the objective lens 10B. Specifications of the objective lens 10B according to the fifth example are shown in Table 45.

TABLE 45

| | First laser beam | Second laser beam | Third laser beam |
|---|---|---|---|
| Design wavelength (nm) | 405 | 660 | 790 |
| Focal length f (mm) | 3.00 | 3.10 | 3.13 |
| NA | 0.65 | 0.63 | 0.51 |
| magnification | 0.000 | 0.000 | 0.000 |

Table 46 shows a numerical configuration of the optical disc drive 100B when the optical disc D1 (the first laser beam) is used, Table 47 shows a numerical configuration of the optical disc drive 100B when the optical disc D2 (the second laser beam) is used, and Table 48 shows a numerical configuration of the optical disc drive 100B when the optical disc D3 (the third laser beam) is used.

TABLE 46

| Surface Number | r | d | n (405 nm) | comments |
|---|---|---|---|---|
| #0 | | 2.81 | | light source |
| #1 | ∞ | 2.00 | 1.52972 | diffraction grating |
| #2 | ∞ | 13.00 | | |
| #3 | 85.710 | 1.50 | 1.52469 | coupling lens |
| #4 | −10.550 | 1.00 | | |
| #5 | ∞ | 4.00 | 1.52972 | beam splitter |
| #6 | ∞ | 1.00 | | |
| #7 | ∞ | 4.00 | 1.52972 | beam splitter |
| #8 | ∞ | 3.08 | | |
| #9 | 1.905 | 2.20 | 1.52469 | objective lens |
| #10 | −5.057 | 1.46 | | |
| #11 | ∞ | 0.60 | 1.62231 | optical disc |
| #12 | ∞ | — | | |

TABLE 47

| Surface Number | r | d | n (660 nm) | comments |
|---|---|---|---|---|
| #0 | | 2.79 | | light source |
| #1 | ∞ | 2.00 | 1.51374 | diffraction grating |
| #2 | ∞ | 13.00 | | |
| #3 | 101.820 | 1.50 | 1.54044 | coupling lens |
| #4 | −10.700 | 1.00 | | |
| #5 | ∞ | 4.00 | 1.51374 | beam splitter |
| #6 | ∞ | 1.00 | | |
| #7 | ∞ | 4.00 | 1.51374 | beam splitter |

TABLE 47-continued

| Surface Number | r | d | n (660 nm) | comments |
|---|---|---|---|---|
| #8 | ∞ | 3.00 | | |
| #9 | 1.905 | 2.20 | 1.50635 | objective lens |
| #10 | −5.057 | 1.54 | | |
| #11 | ∞ | 0.60 | 1.57961 | optical disc |
| #12 | ∞ | — | | |

TABLE 48

| Surface Number | r | d | n (790 nm) | comments |
|---|---|---|---|---|
| #0 | | 2.80 | | light source |
| #1 | ∞ | 2.00 | 1.51052 | diffraction grating |
| #2 | ∞ | 13.00 | | |
| #3 | 94.270 | 1.50 | 1.53653 | coupling lens |
| #4 | −10.700 | 5.00 | | |
| #5 | ∞ | 4.00 | 1.51052 | beam splitter |

TABLE 48-continued

| Surface Number | r | d | n (790 nm) | comments |
|---|---|---|---|---|
| #6 | ∞ | 3.35 | | |
| #7 | 1.905 | 2.20 | 1.50313 | objective lens |
| #8 | −5.057 | 1.19 | | |
| #9 | ∞ | 1.20 | 1.57307 | optical disc |
| #10 | ∞ | — | | |

A second surface of each of the coupling lenses 3A to 3C is an aspherical surface. Each of the surfaces 11B and 12B of the objective lens 10B is an aspherical surface. Table 49 shows the conical coefficient and aspherical coefficients of the aspherical surfaces defined when the optical disc D1 is used. Table 50 shows the conical coefficient and aspherical coefficients of the aspherical surfaces defined when the optical disc D2 is used. Table 51 shows the conical coefficient and aspherical coefficients of the aspherical surfaces defined when the optical disc D3 is used.

TABLE 49

| SURFACE NO. | K | A4 | A6 | A8 | A10 | A12 |
|---|---|---|---|---|---|---|
| 4 | 0.0000 | 7.8520E−05 | 5.3350E−07 | 0.0000E+00 | 0.0000E+00 | 0.0000E+00 |
| 9 | −0.6000 | −3.0000E−03 | −4.9750E−04 | −1.2000E−05 | −8.7300E−07 | −1.2580E−06 |
| 10 | 0.0000 | 2.0270E−02 | −3.5660E−03 | 4.4190E−04 | −2.6170E−05 | −9.2000E−08 |

TABLE 50

| SURFACE NO. | K | A4 | A6 | A8 | A10 | A12 |
|---|---|---|---|---|---|---|
| 4 | 0.0000 | 7.3130E−05 | 4.8300E−07 | 0.0000E+00 | 0.0000E+00 | 0.0000E+00 |
| 9 | −0.6000 | −3.0000E−03 | −4.9750E−04 | −1.2000E−05 | −8.7300E−07 | −1.2580E−06 |
| 10 | 0.0000 | 2.0270E−02 | −3.5660E−03 | 4.4190E−04 | −2.6170E−05 | −9.2000E−08 |

TABLE 51

| SURFACE NO. | K | A4 | A6 | A8 | A10 | A12 |
|---|---|---|---|---|---|---|
| 4 | 0.0000 | 7.4370E−05 | 4.9000E−07 | 0.0000E+00 | 0.0000E+00 | 0.0000E+00 |
| 7 | −0.6000 | −3.0000E−03 | −4.9750E−04 | −1.2000E−05 | −8.7300E−07 | −1.2580E−06 |
| 8 | 0.0000 | 2.0270E−02 | −3.5660E−03 | 4.4190E−04 | −2.6170E−05 | −9.2000E−08 |

Table 52 shows values of the coefficients ($P_2i$ ...) of each of the optical path difference functions applied to the phase shift structure formed on the surface 11B of the objective lens 10B.

TABLE 52

| i | $P_2i$ | $P_4i$ | $P_6i$ | $P_8i$ | $P_{10}i$ | $P_{12}i$ |
|---|---|---|---|---|---|---|
| 1 | 1.9000E+00 | −8.2820E−01 | −1.4990E−01 | 4.4900E−03 | 0.0000E+00 | 0.0000E+00 |
| 2 | 5.0000E−01 | −4.9880E−01 | 4.7960E−02 | 5.4830E−04 | 0.0000E+00 | 0.0000E+00 |

Table 53 shows the diffraction order m at which diffraction efficiency of each of the first to third laser beams takes a maximum value. In Table 53, the diffraction orders m are shown for each of the two optical path difference functions.

TABLE 53

| i | first laser beam | second laser beam | third laser beam |
|---|---|---|---|
| 1 | 3 | 2 | 2 |
| 2 | 2 | 1 | 1 |

As can be seen from Tables 45 and 52, each of the terms of the conditions (15) and (16)(i.e., $(f1 \times P_2 1)/(t3-t1)$) is 9.50. Therefore, the fifth example satisfies the conditions (15) and (16).

Table 54 shows in detail the configuration of the phase shift structure formed on the surface 11B of the objective lens 10B. In Table 54, a height range of each annular zone and the optical path length difference given to the first laser beam passing through each annular zone are shown.

TABLE 54

| Number of annular zone | hmin | hmax | $|\Delta OPD1/\lambda 1|$ | $|\Delta OPD2/\lambda 1|$ | $|\Delta OPDC1/\lambda 3|$ |
|---|---|---|---|---|---|
| 0 | 0.000 | 0.553 | | | |
| 1 | 0.553 | 1.226 | 3.00 | | 1.49 |
| 2 | 1.226 | 1.372 | 3.00 | | 1.49 |
| 3 | 1.372 | 1.398 | | 2.00 | |
| 4 | 1.398 | 1.499 | 3.00 | | 1.49 |
| 5 | 1.499 | 1.575 | 3.00 | | 1.49 |
| 6 | 1.575 | 1.636 | 3.00 | | 1.49 |
| 7 | 1.636 | 1.689 | 3.00 | | 1.49 |
| 8 | 1.689 | 1.693 | 3.00 | | 1.49 |
| 9 | 1.693 | 1.735 | | 2.00 | |
| 10 | 1.735 | 1.776 | 3.00 | | 1.49 |
| 11 | 1.776 | 1.813 | 3.00 | | 1.49 |
| 12 | 1.813 | 1.847 | 3.00 | | 1.49 |
| 13 | 1.847 | 1.879 | 3.00 | | 1.49 |
| 14 | 1.879 | 1.908 | 3.00 | | 1.49 |
| 15 | 1.908 | 1.935 | 3.00 | | 1.49 |
| 16 | 1.935 | 1.950 | 3.00 | | 1.49 |

Since Abbe number vd of the objective lens 10B of the fifth example is 58, the condition (5) is satisfied. As shown in Table 54, the optical path length differences $|\Delta OPD1/\lambda 1|$ and $|\Delta OPD2/\lambda 1|$ given by each step between adjacent annular zones to the first laser beam is 3.00 and 2.00, respectively (i.e., N=1 in the condition (13), and L=1 in the condition (21)). Therefore, conditions (13), (21) and (22) are satisfied. As can be seen from Table 54, $|\Delta OPDC1/\lambda 3|$ is 1.49. Therefore, the condition (18) is satisfied.

Table 55 shows a numerical configuration of an optical system configured in the optical disc drive 100B to detect a focus error signal when the optical disc D3 is used.

TABLE 55

| surface No. | r | d | n(790 nm) | comments |
|---|---|---|---|---|
| 11 | ∞ | 1.20 | 1.57307 | optical disc |
| 12 | ∞ | 1.19 | | |
| 13 | 5.057 | 2.20 | 1.50313 | objective lens |
| 14 | −1.905 | 3.36 | | |
| 15 | ∞ | 4.00 | 1.51052 | beam splitter |
| 16 | ∞ | 5.00 | | |
| 17 | 10.700 | 1.50 | 1.53653 | coupling lens |
| 18 | −94.270 | 9.00 | | |
| 19 | ∞ | 2.20 | 1.51052 | half mirror |
| 20 | ∞ | 7.59 | | |
| 21 | ∞ | — | | photoreceptor |

In Table 55, surfaces #11 and #12 represent the cover layer and the recording surface of the optical disc D3, surfaces #13 and #14 represent the objective lens 10, surfaces #15 and #16 represent the beam splitter 42, surfaces #17 and #18 represent the coupling lens 3C, surfaces #19 and #20 represent the half mirror 5C, and surface #21 represents the photoreceptor 6C.

Figure 16:
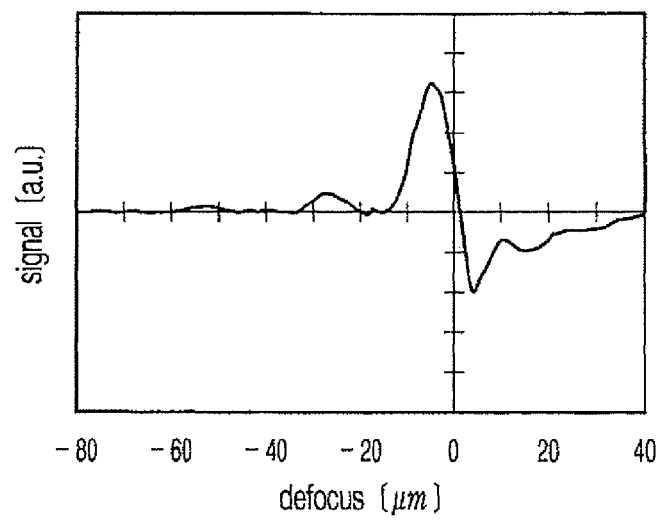
FIG. 16 illustrates a focus error signal detected by a photoreceptor when the third optical disc is used in the optical disc drive according to a fifth example.

FIG. 16 illustrates a focus error signal detected by the photoreceptor 6C when the optical disc D3 is used in the optical disc drive 100B. As can be seen from FIG. 16, the focus error signal detected by the photoreceptor 6C of the fifth example has a suitable waveform formed in the shape of the letter S. By satisfying the conditions (15) and (16), the optical disc drive 100B according to the fifth example is able to prevent deformation of the focus error signal and thereby suitably suppress the deterioration of the focusing performance.

As can be seen from Table 45 and FIGS. 6A to 6C, in the optical disc drive 100B according to the fifth example, f1×M1 is 0.000, f2×M2 is 0.000, and f3×M3 is 0.00. Therefore, it is possible to prevent occurrence of the spherical aberration in the tracking operation for each of the optical discs D1 to D3.

Figures 17A, 17B, 17C:
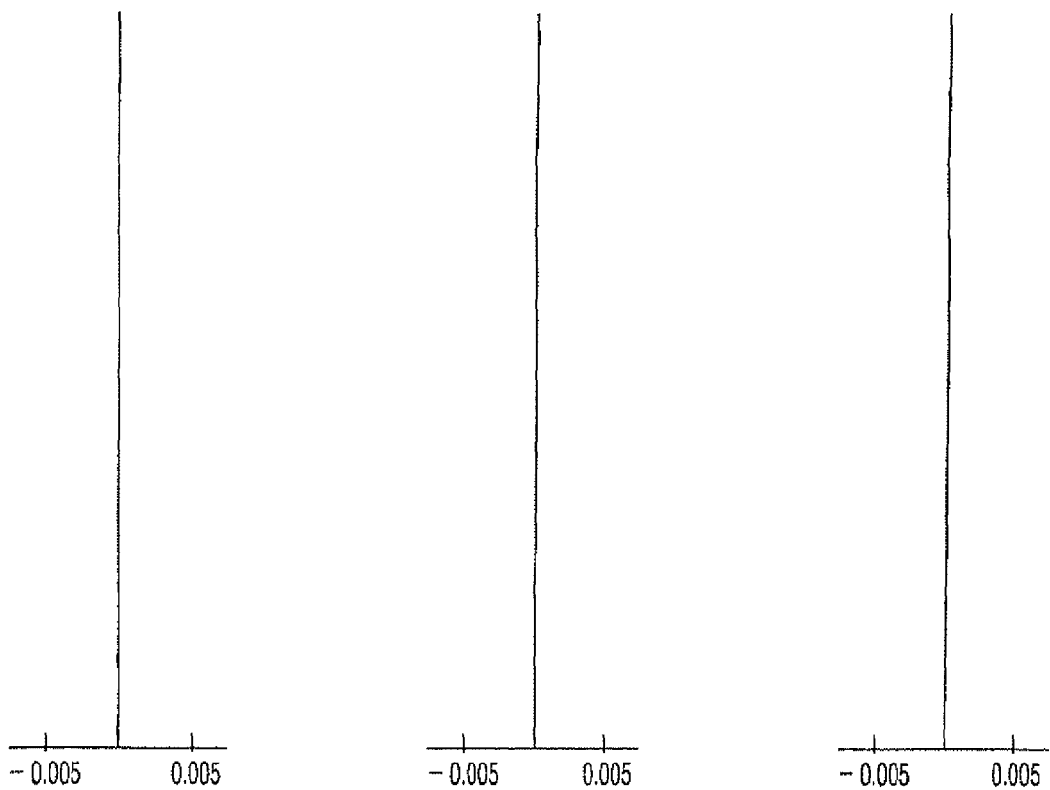
FIG. 17A is a graph illustrating spherical aberration caused when the first laser beam is used in the optical disc drive according to the fifth example.
FIG. 17B is a graph illustrating the spherical aberration caused when the second laser beam is used in the optical disc drive according to the fifth example.
FIG. 17C is a graph illustrating the spherical aberration caused when the third laser beam is used in the optical disc drive according to the fifth example.

FIG. 17A is a graph illustrating the spherical aberration caused when the first laser beam is used in the optical disc drive 100B according to the fifth example. FIG. 17B is a graph illustrating the spherical aberration caused when the second laser beam is used in the optical disc drive 100B according to the fifth example. FIG. 17C is a graph illustrating the spherical aberration caused when the third laser beam is used in the optical disc drive 100B according to the fifth example. As shown in FIGS. 17A to 17C, the spherical aberration is suitably compensated and a suitable beam spot is formed for each of the optical discs D1 to D3.

SIXTH EXAMPLE

The objective lens 10B according to the sixth example is provided with the phase shift structure having steps producing two different optical path length differences. Tile phase shift structure is formed on the surface 11E of the objective lens 10B. Specifications of the objective lens 10B according to the sixth example are shown in Table 56.

TABLE 56

| | First laser beam | Second laser beam | Third laser beam |
|---|---|---|---|
| Design wavelength (nm) | 408 | 660 | 790 |
| Focal length f (mm) | 2.25 | 2.32 | 2.35 |
| NA | 0.65 | 0.65 | 0.47 |
| Magnification | 0.000 | 0.000 | 0.000 |

Table 57 shows a numerical configuration of the optical disc drive 100B when the optical disc D1 (the first laser beam) is used, Table 58 shows a numerical configuration of the optical disc drive 100B when the optical disc D2 (the second laser beam-n) is used, and Table 59 shows a numerical configuration of the optical disc drive 100B when the optical disc D3 (the third laser beam) is used.

In this example, the phase shift structure formed on the surface 11B (#9) of the objective lens 10B is divided into three regions including the first to third regions. The first region is configured to converge the third laser beam on the recording surface of the optical disc D3. The second region, which is formed outside the first region, is configured to converge the first and second laser beams on the recording surfaces of the optical discs D1 and D2, respectively. The third region, which is formed outside the second region, is configured to converge only the second laser beam on the recording surface of the optical disc D1 and not to contribute to converging the first and third laser beams.

TABLE 57

| Surface Number | r | d | n (405 nm) | comments |
|---|---|---|---|---|
| #0 | | 2.81 | | light source |
| #1 | ∞ | 2.00 | 1.52934 | diffraction grating |
| #2 | ∞ | 13.00 | | |
| #3 | 85.020 | 1.50 | 1.52424 | coupling lens |
| #4 | −10.550 | 1.00 | | |
| #5 | ∞ | 3.20 | 1.52934 | beam splitter |
| #6 | ∞ | 1.00 | | |
| #7 | ∞ | 3.20 | 1.52934 | beam splitter |
| #8 | ∞ | 3.05 | | |
| #9(1$^{st}$region) | 1.427 | 1.70 | 1.52424 | objective lens |
| #9(2$^{nd}$region) | 1.464 | | | |
| #9(3$^{rd}$region) | 1.475 | | | |
| #10 | −3.560 | 0.99 | | |
| #11 | ∞ | 0.60 | 1.62110 | optical disc |
| #12 | ∞ | — | | |

TABLE 58

| Surface Number | r | d | n (660 nm) | comments |
|---|---|---|---|---|
| #0 | | 2.79 | | light source |
| #1 | ∞ | 2.00 | 1.51374 | diffraction grating |
| #2 | ∞ | 13.00 | | |
| #3 | 101.820 | 1.50 | 1.54044 | coupling lens |
| #4 | −10.700 | 1.00 | | |
| #5 | ∞ | 3.20 | 1.51374 | beam splitter |
| #6 | ∞ | 1.00 | | |
| #7 | ∞ | 3.20 | 1.51374 | beam splitter |
| #8 | ∞ | 3.00 | | |
| #9(1$^{st}$region) | 1.427 | 1.70 | 1.50635 | objective lens |
| #9(2$^{nd}$region) | 1.464 | | | |

TABLE 58-continued

| Surface Number | r | d | n (660 nm) | comments |
|---|---|---|---|---|
| #9(3$^{rd}$region) | 1.475 | | | |
| #10 | −3.560 | 1.04 | | |
| #11 | ∞ | 0.60 | 1.57961 | optical disc |
| #12 | ∞ | — | | |

TABLE 59

| Surface Number | r | d | n (790 nm) | comments |
|---|---|---|---|---|
| #0 | | 2.80 | | light source |
| #1 | ∞ | 2.00 | 1.51052 | diffraction grating |
| #2 | ∞ | 13.00 | | |
| #3 | 94.370 | 1.50 | 1.53653 | coupling lens |
| #4 | −10.700 | 5.60 | | |
| #5 | ∞ | 3.20 | 1.51052 | beam splitter |
| #6 | ∞ | 3.35 | | |
| #7(1$^{st}$region) | 1.427 | 1.70 | 1.50313 | objective lens |
| #7(2$^{nd}$region) | 1.464 | | | |
| #7(3$^{rd}$region) | 1.475 | | | |
| #8 | −3.560 | 0.69 | | |
| #9 | ∞ | 1.20 | 1.57307 | optical disc |
| #10 | ∞ | — | | |

A second surface of each of the coupling lenses 3A to 3C is an aspherical surface. Each of the surfaces 11B and 12B of the objective lens 10B is an aspherical surface. Table 60 shows the conical coefficient and aspherical coefficients of the aspherical surfaces defined when the optical disc D1 is used. Table 61 shows the conical coefficient and aspherical coefficients of the aspherical surfaces defined when the optical disc D2 is used. Table 62 shows the conical coefficient and aspherical coefficients of the aspherical surfaces defined when the optical disc D3 is used.

TABLE 60

| SURFACE NO. | K | A4 | A6 | A8 | A10 | A12 |
|---|---|---|---|---|---|---|
| 4 | 0.0000 | 7.8600E−05 | 5.4830E−07 | 0.0000E+00 | 0.0000E+00 | 0.0000E+00 |
| 9(1$^{st}$ region) | −0.6500 | −7.3320E−03 | −2.6800E−03 | −1.0670E−04 | −3.4970E−05 | −8.0350E−07 |
| 9(2$^{nd}$ region) | −0.6500 | −7.7460E−04 | −1.9590E−03 | −3.1680E−04 | −2.1890E−05 | 6.2120E−06 |
| 9(3$^{rd}$ region) | −0.6500 | −3.4180E−03 | −3.8880E−04 | −6.0640E−06 | −3.7140E−05 | 4.0330E−06 |
| 10 | 0.0000 | 5.0000E−02 | −1.7570E−02 | 5.8280E−03 | −1.3110E−03 | 1.4330E−04 |

TABLE 61

| SURFACE NO. | K | A4 | A6 | A8 | A10 | A12 |
|---|---|---|---|---|---|---|
| 4 | 0.0000 | 7.3130E−05 | 4.8300E−07 | 0.0000E+00 | 0.0000E+00 | 0.0000E+00 |
| 9(1$^{st}$ region) | −0.6500 | −7.3320E−03 | −2.6800E−03 | −1.0670E−04 | −3.4970E−05 | −8.0350E−07 |
| 9(2$^{nd}$ region) | −0.6500 | −7.7460E−04 | −1.9590E−03 | −3.1680E−04 | −2.1890E−05 | 6.2120E−06 |
| 9(3$^{rd}$ region) | −0.6500 | −3.4180E−03 | −3.8880E−04 | −6.0640E−06 | −3.7140E−05 | 4.0330E−06 |
| 10 | 0.0000 | 5.0000E−02 | −1.7570E−02 | 5.8280E−03 | −1.3110E−03 | 1.4330E−04 |

TABLE 62

| SURFACE NO. | K | A4 | A6 | A8 | A10 | A12 |
|---|---|---|---|---|---|---|
| 4 | 0.0000 | 7.4370E−05 | 4.9000E−07 | 0.0000E+00 | 0.0000E+00 | 0.0000E+00 |
| 7(1$^{st}$ region) | −0.6500 | −7.3320E−03 | −2.6800E−03 | −1.0670E−04 | −3.4970E−05 | −8.0350E−07 |

TABLE 62-continued

| SURFACE NO. | K | A4 | A6 | A8 | A10 | A12 |
|---|---|---|---|---|---|---|
| 7($2^{nd}$ region) | −0.6500 | −7.7460E−04 | −1.9590E−03 | −3.1680E−04 | −2.1890E−05 | 6.2120E−06 |
| 7($3^{rd}$ region) | −0.6500 | −3.4180E−03 | −3.8880E−04 | −6.0640E−06 | −3.7140E−05 | 4.0330E−06 |
| 8 | 0.0000 | 5.0000E−02 | −1.7570E−02 | 5.8280E−03 | −1.3110E−03 | 1.4330E−04 |

Table 63 shows values of the coefficients ($P_2i$ ...) of the optical path difference functions applied to the phase shift structure formed on the surface 11B of the objective lens 10B.

TABLE 63

| | $P_2i$ | $P_4i$ | $P_6i$ | $P_8i$ | $P_{10}i$ | $P_{12}i$ |
|---|---|---|---|---|---|---|
| $1^{st}$ region (i = 1) | 3.2300E+00 | −2.4430E+00 | −7.6480E−01 | 2.8900E−02 | 0.0000E+00 | 0.0000E+00 |
| $2^{nd}$ region (i = 2) | 2.3750E+00 | −1.6980E+00 | 2.6620E−02 | 4.1440E−02 | 0.0000E+00 | 0.0000E+00 |
| $2^{nd}$ region | 1.0206E+00 | −9.4310E−00 | −6.7580E−01 | −7.7410E−02 | 1.9130E−02 | 0.0000E+00 |
| $3^{rd}$ region | 8.7064E−02 | −4.0006E+00 | 0.0000E+00 | 0.0000E+00 | 0.0000E+00 | 0.0000E+00 |

Table 64 shows the diffraction order m at which diffraction efficiency of each of the first to third laser beams takes a maximum value. In Table 64, the diffraction orders m are shown for each of the two optical path difference functions in the first region. In Table 64, an effective radius (mm) of each of the first to third regions is shown.

TABLE 64

| (surface 11) | first laser beam | second laser beam | third laser beam | effective radius |
|---|---|---|---|---|
| $1^{st}$ region (i = 1) | 3 | 2 | 2 | 1.100 |
| $1^{st}$ region (i = 2) | 2 | 1 | 1 | |
| $2^{nd}$ region | 3 | 2 | — | 1.460 |
| $3^{rd}$ region | — | 1 | — | 1.510 |

Table 65 shows a numerical configuration of an optical system configured in the optical disc drive 100B to detect a focus error signal when the optical disc D3 is used.

TABLE 65

| surface No. | R | d | n(790 nm) | comments |
|---|---|---|---|---|
| 11 | ∞ | 1.20 | 1.57307 | optical disc |
| 12 | ∞ | 0.69 | | |
| 13 | 3.560 | 1.70 | 1.50313 | objective lens |
| 14($1^{st}$ region) | −1.427 | 3.35 | | |
| 14($2^{nd}$ region) | −1.464 | | | |
| 14($3^{rd}$ region) | −1.475 | | | |
| 15 | ∞ | 3.20 | 1.51052 | beam splitter |
| 16 | ∞ | 5.60 | | |
| 17 | 10.700 | 1.50 | 1.53653 | coupling lens |
| 18 | −94.370 | 9.00 | | |
| 19 | ∞ | 2.18 | 1.51052 | half mirror |
| 20 | ∞ | 7.60 | | |
| 21 | ∞ | — | | photoreceptor |

In Table 65, surfaces #11 and #12 represent the recording surface and the cover layer of the optical disc D3, surfaces #13 and #14 represent the objective lens 10, surfaces #15 and #16 represent the beam splitter 42, surfaces #17 and #18 represent the coupling lens 3C, surfaces #19 and #20 represent the half mirror 5C, and surface #21 represents the photoreceptor 6C.

Table 66 shows in detail the configuration of the phase shift structure formed on the surface 11B of the objective lens 10B. In Table 66, a height range of each annular zone and the optical path length differences |ΔOPD1/λ1| and |ΔOPD2/λ1| given to the first laser beam and the optical path length differences |ΔOPDD1/λ2| and |ΔOPDC1/λ3| respectively given to the second and third laser beams passing through each annular zone are shown.

TABLE 66

| Annular Zone Number | region | hmin | hmax | \|ΔOPD1/λ1\| | \|ΔOPD2/λ1\| | \|ΔOPDD1/λ2\| | \|ΔOPDC1/λ3\| |
|---|---|---|---|---|---|---|---|
| 0 | 1 | 0.000 | 0.508 | | 2.00 | | |
| 1 | | 0.508 | 0.927 | 3.10 | | 1.85 | 1.54 |
| 2 | | 0.927 | 1.061 | 3.10 | | 1.85 | 1.54 |
| 3 | | 1.061 | 1.100 | 3.10 | | 1.85 | 1.54 |
| 4 | 2 | 1.100 | 1.185 | 2.00 | | 1.19 | 0.99 |
| 5 | | 1.185 | 1.246 | 3.00 | | 1.79 | 1.49 |
| 6 | | 1.246 | 1.296 | 3.00 | | 1.79 | 1.49 |

TABLE 66-continued

| Annular Zone Number | region | hmin | hmax | $|\Delta OPD1/\lambda1|$ | $|\Delta OPD2/\lambda1|$ | $|\Delta OPDD1/\lambda2|$ | $|\Delta OPDC1/\lambda3|$ |
|---|---|---|---|---|---|---|---|
| 7 |  | 1.296 | 1.337 | 3.00 |  | 1.79 | 1.49 |
| 8 |  | 1.337 | 1.374 | 3.00 |  | 1.79 | 1.49 |
| 9 |  | 1.374 | 1.406 | 3.00 |  | 1.79 | 1.49 |
| 10 |  | 1.406 | 1.435 | 3.00 |  | 1.79 | 1.49 |
| 11 |  | 1.435 | 1.460 | 3.00 |  | 1.79 | 1.49 |
| 12 | 3 | 1.460 | 1.470 |  |  | 1.00 |  |
| 13 |  | 1.470 | 1.490 |  |  | 1.00 |  |
| 14 |  | 1.490 | 1.510 |  |  | 1.00 |  |

In this example, $|\Delta OPD/\lambda1|$ is 3.10 (N=1), $(f^*P_21)/(t3-t1)$ is 12.11, vd is approximately 58, $|\Delta OPDC1/\lambda3|$ is 1.54, $|\Delta OPD2/\lambda1|$ is 2.00 (L=1), f1×NA1 is 1.46, and f2×NA2 is 1.51. Therefore, conditions (15), (16), (17), (18), (21) and (24) are satisfied.

FIG. 18 illustrates a focus error signal detected by the photoreceptor 6C when the optical disc D3 is used in the optical disc drive 100B. As can be seen from FIG. 18, the focus error signal detected by the photoreceptor 6C of the sixth example has a suitable waveform formed in the shape of the letter S. By satisfying the conditions (15) and (16), the optical disc drive 100B according to the sixth example is able to prevent deformation of the focus error signal and thereby suitably suppress the deterioration of the focusing performance.

In the optical disc drive 100B according to the sixth example, f1×M1 is 0.000, f2×M2 is 0,000, and F3×M3 is 0.00. Therefore, it is possible to prevent occurrence of the spherical aberration in the tracking operation for each of the optical discs D1 to D3.

FIG. 19A is a graph illustrating the spherical aberration caused when the first laser beam is used in the optical disc drive 100B according to the sixth example. FIG. 19B is a graph illustrating the spherical aberration caused when the second laser beam is used in the optical disc drive 100B according to the sixth example. FIG. 19C is a graph illustrating the spherical aberration caused when the third laser beam is used in the optical disc drive 100B according to the sixth example. As shown in FIGS. 19A to 19C, the spherical aberration is suitably compensated and a suitable beam spot is formed for each of the optical discs D1 to D3.

SEVENTH EXAMPLE

The objective lens 10B according to the seventh example is provided with the phase shift structure having steps producing two different optical path length differences. The phase shift structure is formed on the surface 11B of the objective lens 10B. Specifications of the objective lens 10B according to the sixth example are shown in Table 67.

TABLE 67

|  | First laser beam | Second laser beam | Third laser beam |
|---|---|---|---|
| Design wavelength (nm) | 408 | 660 | 790 |
| Focal length f (mm) | 2.25 | 2.32 | 2.34 |
| NA | 0.65 | 0.65 | 0.47 |
| Magnification | 0.000 | 0.000 | 0.000 |

Table 68 shows a numerical configuration of the optical disc drive 100B when the optical disc D1 (the first laser beam) is used, Table 69 shows a numerical configuration of the optical disc drive 100B when the optical disc D2 (the second laser beam) is used, and Table 70 shows a numerical configuration of the optical disc drive 100B when the optical disc D3 (the third laser beam) is used.

In this example, the surface 11B (#9) of the objective lens 10B is divided into three regions including the first to third regions. The first region is configured to converge the third laser beam on the recording surface of the optical disc D3. The second region, which is formed outside the first region, is configured to converge the first and second laser beams on the recording surfaces of the optical discs D1 and D2, respectively. The third region, which is formed outside the second region, is configured to converge only the second laser beam on the recording surface of the optical disc D1 and not to contribute to converging the first and third laser beams.

TABLE 68

| Surface Number | r | d | n (408 nm) | comments |
|---|---|---|---|---|
| #0 |  | 2.81 |  | light source |
| #1 | ∞ | 2.00 | 1.52934 | diffraction grating |
| #2 | ∞ | 13.00 |  |  |
| #3 | 85.020 | 1.50 | 1.52424 | coupling lens |
| #4 | −10.550 | 1.00 |  |  |
| #5 | ∞ | 3.20 | 1.52934 | beam splitter |
| #6 | ∞ | 1.00 |  |  |
| #7 | ∞ | 3.20 | 1.52934 | beam splitter |
| #8 | ∞ | 3.06 |  |  |
| #9(1$^{st}$region) | 1.398 | 1.70 | 1.52424 | objective lens |
| #9(2$^{nd}$region) | 1.429 |  |  |  |
| #9(3$^{rd}$region) | 1.429 |  |  |  |
| #10 | −3.983 | 0.96 |  |  |
| #11 | ∞ | 0.60 | 1.62110 | optical disc |
| #12 | ∞ | — |  |  |

TABLE 69

| Surface Number | r | d | n (660 nm) | comments |
|---|---|---|---|---|
| #0 |  | 2.79 |  | light source |
| #1 | ∞ | 2.00 | 1.51374 | diffraction grating |
| #2 | ∞ | 13.00 |  |  |
| #3 | 101.820 | 1.50 | 1.54044 | coupling lens |
| #4 | −10.700 | 1.00 |  |  |
| #5 | ∞ | 3.20 | 1.51374 | beam splitter |
| #6 | ∞ | 1.00 |  |  |
| #7 | ∞ | 3.20 | 1.51374 | beam splitter |
| #8 | ∞ | 3.00 |  |  |
| #9 (1$^{st}$ region) | 1.398 | 1.70 | 1.50635 | objective lens |
| #9 (2$^{nd}$ region) | 1.429 |  |  |  |
| #9 (3$^{rd}$ region) | 1.429 |  |  |  |
| #10 | −3.983 | 1.02 |  |  |
| #11 | ∞ | 0.60 | 1.57961 | optical disc |
| #12 | ∞ | — |  |  |

TABLE 70

| Surface Number | r | d | n (790 nm) | comments |
|---|---|---|---|---|
| #0 | | 2.80 | | light source |
| #1 | ∞ | 2.00 | 1.51052 | diffraction grating |
| #2 | ∞ | 13.00 | | |
| #3 | 94.370 | 1.50 | 1.53653 | coupling lens |
| #4 | −10.700 | 3.90 | | |
| #5 | ∞ | 3.20 | 1.51052 | beam splitter |
| #6 | ∞ | 3.37 | | |
| #7 (1$^{st}$ region) | 1.398 | 1.70 | 1.50313 | objective lens |
| #7 (2$^{nd}$ region) | 1.429 | | | |
| #7 (3$^{rd}$ region) | 1.429 | | | |
| #8 | −3.983 | 0.65 | | |

TABLE 70-continued

| Surface Number | r | d | n (790 nm) | comments |
|---|---|---|---|---|
| #9 | ∞ | 1.20 | 1.57307 | optical disc |
| #10 | ∞ | — | | |

A second surface of each of the coupling lenses 3A to 3C is an aspherical surface. Each of the surfaces 11B and 12B of the objective lens 10B is an aspherical surface. Table 71 shows the conical coefficient and aspherical coefficients of the aspherical surfaces defined when the optical disc D1 is used. Table 72 shows the conical coefficient and aspherical coefficients of the aspherical surfaces defined when the optical disc D2 is used. Table 73 shows the conical coefficient and aspherical coefficients of the aspherical surfaces defined when the optical disc D3 is used.

TABLE 71

| SURFACE NO. | K | A4 | A6 | A8 | A10 | A12 |
|---|---|---|---|---|---|---|
| 4 | 0.0000 | 7.8600E−05 | 5.4830E−07 | 0.0000E+00 | 0.0000E+00 | 0.0000E+00 |
| 9(1$^{st}$ region) | −0.6500 | −3.4080E−03 | −1.1820E−03 | −8.9480E−04 | −2.6130E−04 | −2.2600E−05 |
| 9(2$^{nd}$ region) | −0.6500 | 2.3100E−03 | 8.5240E−04 | −6.8160E−04 | −3.3910E−04 | 4.1110E−07 |
| 9(3$^{rd}$ region) | −0.6500 | 9.4620E−04 | 5.0670E−04 | −5.5420E−04 | −6.7250E−05 | −2.8170E−05 |
| 10 | 0.0000 | 6.9510E−02 | −5.0350E−02 | 2.5560E−02 | −7.6720E−03 | 1.0090E−03 |

TABLE 72

| SURFACE NO. | K | A4 | A6 | A8 | A10 | A12 |
|---|---|---|---|---|---|---|
| 4 | 0.0000 | 7.3130E−05 | 4.8300E−07 | 0.0000E+00 | 0.0000E+00 | 0.0000E+00 |
| 9(1$^{st}$ region) | −0.6500 | −3.4080E−03 | −1.1820E−03 | −8.9480E−04 | −2.6130E−04 | −2.2600E−05 |
| 9(2$^{nd}$ region) | −0.6500 | 2.3100E−03 | 8.5240E−04 | −6.8160E−04 | −3.3910E−04 | 4.1110E−07 |
| 9(3$^{rd}$ region) | −0.6500 | 9.4620E−04 | 5.0670E−04 | −5.5420E−04 | −6.7250E−05 | −2.8170E−05 |
| 10 | 0.0000 | 6.9510E−02 | −5.0350E−02 | 2.5560E−02 | −7.6720E−03 | 1.0090E−03 |

TABLE 73

| SURFACE NO. | K | A4 | A6 | A8 | A10 | A12 |
|---|---|---|---|---|---|---|
| 4 | 0.0000 | 7.4370E−05 | 4.9000E−07 | 0.0000E+00 | 0.0000E+00 | 0.0000E+00 |
| 7 (1$^{st}$ region) | −0.6500 | −3.4080E−03 | −1.1820E−03 | −8.9480E−04 | −2.6130E−04 | −2.2600E−05 |
| 7 (2$^{nd}$ region) | −0.6500 | 2.3100E−03 | 8.5240E−04 | −6.8160E−04 | −3.3910E−04 | 4.1110E−07 |
| 7 (3$^{rd}$ region) | −0.6500 | 9.4620E−04 | 5.0670E−04 | −5.5420E−04 | −6.7250E−05 | −2.8170E−05 |
| 8 | 0.0000 | 6.9510E−02 | −5.0350E−02 | 2.5560E−02 | −7.6720E−03 | 1.0090E−03 |

Table 74 shows values of the coefficients ($P_2i$ ... ) of the optical path difference functions applied to the phase shift structure formed on the surface 11B of the objective lens 10B.

TABLE 74

| | $P_2i$ | $P_4i$ | $P_6i$ | $P_8i$ | $P_{10}i$ | $P_{12}i$ |
|---|---|---|---|---|---|---|
| 1$^{st}$ region (i = 1) | 2.0160E+00 | −2.7130E+00 | −3.6720E−01 | −1.2200E−01 | 0.0000E+00 | 0.0000E+00 |
| 2$^{nd}$ region (i = 2) | 6.6080E−02 | 1.0970E+00 | 2.8960E−01 | 0.0000E+00 | 0.0000E+00 | 0.0000E+00 |
| 2$^{nd}$ region | 8.0690E−02 | −1.4970E+00 | 2.6250E−01 | −2.6190E−01 | 0.0000E+00 | 0.0000E+00 |
| 3$^{rd}$ regin | 1.6140E−01 | −3.9310E+00 | 0.0000E+00 | 0.0000E+00 | 0.0000E+00 | 0.0000E+00 |

Table 75 shows the diffraction order m at which diffraction efficiency of each of the first to third laser beams takes a maximum value. In Table 75, the diffraction orders m are shown for each of the two optical path difference functions in the first region. In Table 75, an effective radius (mm) of each of the first to third regions is shown.

In Table 77, a height range of each annular zone and the optical path length differences $|\Delta OPD1/\lambda 1|$ and $|\Delta OPD2/\lambda 1|$ given to the first laser beam and the optical path length differences $|\Delta OPDD1/\lambda 2|$ and $|\Delta OPDC1/\lambda 3|$ respectively given to the second and third laser beams passing through each annular zone are shown.

TABLE 77

| Annular Zone Number | region | hmin | hmax | $|\Delta OPD1/\lambda 1|$ | $|\Delta OPD2/\lambda 1|$ | $|\Delta OPDD1/\lambda 2|$ | $|\Delta OPDC1/\lambda 3|$ |
|---|---|---|---|---|---|---|---|
| 0 | 1 | 0.000 | 0.776 | | | | |
| 1 | | 0.776 | 0.917 | | 2.00 | | |
| 2 | | 0.917 | 1.007 | 5.23 | | 3.12 | 2.59 |
| 3 | | 1.007 | 1.029 | | 2.00 | | |
| 4 | 2 | 1.029 | 1.100 | 5.23 | | 3.12 | 2.59 |
| 5 | | 1.100 | 1.212 | 2.00 | | 1.19 | 0.99 |
| 6 | | 1.212 | 1.274 | 3.00 | | 1.79 | 1.49 |
| 7 | | 1.274 | 1.323 | 3.00 | | 1.79 | 1.49 |
| 8 | | 1.323 | 1.365 | 3.00 | | 1.79 | 1.49 |
| 9 | | 1.365 | 1.401 | 3.00 | | 1.79 | 1.49 |
| 10 | | 1.401 | 1.432 | 3.00 | | 1.79 | 1.49 |
| 11 | | 1.432 | 1.460 | 3.00 | | 1.79 | 1.49 |
| 12 | 3 | 1.460 | 1.480 | | | 1.00 | |
| 13 | | 1.480 | 1.499 | | | 1.00 | |
| 14 | | 1.499 | 1.510 | | | 1.00 | |

TABLE 75

| (surface 11) | first laser beam | second laser beam | third laser beam | effective radius |
|---|---|---|---|---|
| $1^{st}$ region (i = 1) | 5 | 3 | 3 | 1.100 |
| $1^{st}$ region (i = 2) | 2 | 1 | 1 | |
| $2^{nd}$ region | 3 | 2 | — | 1.460 |
| $3^{rd}$ region | — | 1 | — | 1.510 |

Table 76 shows a numerical configuration of an optical system configured in the optical disc drive 100B to detect a focus error signal when the optical disc D3 is used.

TABLE 76

| surface No. | r | d | n(790 nm) | Comments |
|---|---|---|---|---|
| 11 | ∞ | 1.20 | 1.57307 | optical disc |
| 12 | ∞ | 0.65 | | |
| 13 | 3.983 | 1.70 | 1.50313 | objective lens |
| 14 ($1^{st}$ region) | −1.398 | 3.37 | | |
| 14 ($2^{nd}$ region) | −1.429 | | | |
| 14 ($3^{rd}$ region) | −1.429 | | | |
| 15 | ∞ | 3.20 | 1.51052 | beam splitter |
| 16 | ∞ | 2.85 | | |
| 17 | 10.700 | 1.50 | 1.53653 | coupling lens |
| 18 | −94.370 | 9.00 | | |
| 19 | ∞ | 2.18 | 1.51052 | half mirror |
| 20 | ∞ | 7.60 | | |
| 21 | ∞ | — | | photoreceptor |

In Table 76, surfaces #11 and #12 represent the recording surface and the cover layer of the optical disc D3, surfaces #13 and #14 represent the objective lens 10, surfaces #15 and #16 represent the beam splitter 42, surfaces #17 and #18 represent the coupling lens 3C, #19 and #20 represent the half mirror 5C, and surface #21 represents the photoreceptor 6C.

Table 77 shows in detail the configuration of the phase shift structure formed on the surface 11B of the objective lens l0B.

In this example, $|\Delta OPD/\lambda 1|$ is 5.23 (N=2), $(f^*P_21)/(t3-t1)$ is 7.56, vd is approximately 58, $|\Delta OPDC1/\lambda 3|$ is 2.59, $|\Delta OPD2/\lambda 1|$ is 2.00 (N=1), f1×NA1 is 1.46, and f2×NA2 is 1.51. Therefore, conditions (15), (16), (19), (20), (21) and (24) are satisfied.

Figure 20:
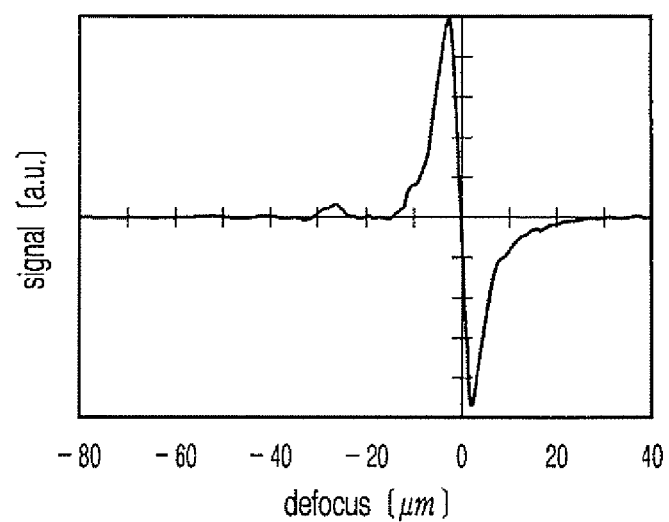
FIG. 20 illustrates a focus error signal detected by a photoreceptor when the third optical disc is used in the optical disc drive according to a seventh example.

FIG. 20 illustrates a focus error signal detected by the photoreceptor 6C when the optical disc D3 is used in the optical disc drive 100B. As can be seen from FIG. 20, the focus error signal detected by the photoreceptor 6C of the seventh example has a suitable waveform formed in the shape of the letter S. By satisfying the conditions (14) and (15), the optical disc drive 100B according to the seventh example is able to prevent deformation of the focus error signal and thereby suitably suppress the deterioration of the focusing performance.

In the optical disc drive 100B according to the seventh example, f1×M1 is 0.000, f2×M2 is 0.000, and f3×M3 is 0.00. Therefore, it is possible to prevent occurrence of the spherical aberration in the tracking operation for each of the optical discs D1 to D3.

Figures 21A, 21B, 21C:
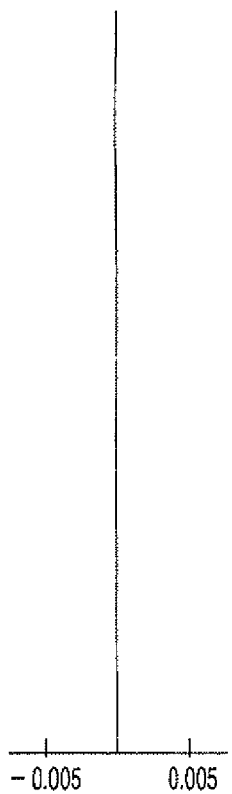
FIG. 21A is a graph illustrating spherical aberration caused when the first laser beam is used in the optical disc drive according to the seventh example.
FIG. 21B is a graph illustrating the spherical aberration caused when the second laser beam is used in the optical disc drive according to the seventh example.
FIG. 21C is a graph illustrating the spherical aberration caused when the third laser beam is used in the optical disc drive according to the seventh example.

FIG. 21A is a graph illustrating the spherical aberration caused when the first laser beam is used in the optical disc drive 100B according to the seventh example. FIG. 21B is a graph illustrating the spherical aberration caused when the second laser beam is used in the optical disc drive 100B according to the seventh example. FIG. 21C is a graph illustrating the spherical aberration caused when the third laser beam is used in the optical disc drive 100B according to the seventh example. As shown in FIGS. 21A to 21C, the spherical aberration is suitably compensated and a suitable beam spot is formed for each of the optical discs D1 to D3.

Although the present invention has been described in considerable detail with reference to certain preferred embodiments thereof, other embodiments are possible.

Various numerical configurations according to the above mentioned embodiments are possible. The objective lens according to the embodiments can be attained as an objective lens system including a plurality of optical elements. When the objective lens system including a plurality of optical elements is employed, an optical element in the objective lens system may be configured to have phase shift structures on both surfaces thereof.

As shown in the above mentioned concrete examples, the focal lengths of the coupling lenses 3A to 3C which are located between the light sources 1A to 1C and the optical discs D1 to D3, respectively, are different from each other due to the difference between refractive indexes which vary depending on the wavelength differences between the first to third laser beams. The optical disc drive may be configured such that the first to third laser beams emitted by the light sources 1A to 1C are directed to the recording surface of an optical disc via a common coupling lens. In this case, if the light sources 1A and 1B respectively emitting the first and second laser beams are located on a common substrate (i.e., the light sources 1A and 1B are located at the same distance from the common coupling lens), one of the first and second laser beams is inevitably formed as a converging beam or a diverging beam.

However, even if one of the first and second laser beams is inevitably formed as a converging beam or a diverging beam, the advantages of the above mentioned embodiments can also be achieved by configuring the objective lens so that the magnification of the objective lens is minimized as small as possible.

This application claims priority of Japanese Patent Application No. P2005-203094, filed on Jul. 12, 2005. The entire subject matter of the application is incorporated herein by reference.

What is claimed is:

1. An objective lens used for recording information to and/or reproducing information from three types of optical discs including a first optical disc having a highest recording density, a second optical disc having a second highest recording density and a third optical disc having a lowest recording density by selectively using one of three types of light beams including a first light beam having a shortest wavelength, a second light beam having a second shortest wavelength and a third light beam having a longest wavelength, at least one of surfaces of the objective lens comprising a first region converging the third light beam on a recording surface of the third optical disc, the first region comprising a step structure configured to have a plurality of concentric refractive surface zones and to give an optical path length difference to an incident beam at each step formed between adjacent refractive surface zones, wherein the step structure is configured such that:

the optical path length difference given by each step is substantially equal to an odd multiple of the wavelength of the first light beam; and a value of differentiation of an optical path difference function defining the step structure crosses zero in a height ranging from 30% to 70% of an effective diameter of the first region;

wherein when the wavelength of the first light beam is represented by $\lambda 1$ (nm), an optical path length difference given by each step to the first light beam is represented by $\Delta OPD$ (nm), the step structure satisfies a condition:

$$2N+0.70<|\Delta OPD/\lambda 1|<2N+1.30 \tag{1}$$

where N represents an integer, wherein when the optical path difference function is expressed by an equation:

$$\phi(h)=(P_2h^2+P_4h^4+P_6h^6+P_8h^8+P_{10}h^{10}+P_{12}h^{12})m\lambda \tag{2}$$

where $P_2$, $P_4$ and $P_6$ ... are coefficients of second, fourth, sixth ... orders, h represents a height from an optical axis, m represents a diffraction order at which diffraction efficiency is maximized, and $\lambda$ represents a working wavelength of a light beam being used, the objective lens satisfies a condition:

$$2.50<(f1\times P_2)/(t3-t1)<13.00 \tag{4}$$

where f1 represents a focal length of the objective lens defined when the first light beam is used, and t1 and t3 (where t1<t3) respectively represent thicknesses of cover layers of the first and third optical discs.

2. An optical disc drive for recording information to and/or reproducing information from three types of optical discs including a first optical disc having a highest recording density, a second optical disc having a second highest recording density and a third optical disc having a lowest recording density by selectively using one of three types of light beams including first, second and third light beams, the optical disc drive comprising an objective lens, when wavelengths of the first to third light beams are respectively represented by $\lambda 1$ (nm), $\lambda 2$ (nm) and $\lambda 3$ (nm), a relationship $\lambda 1<\lambda 2<\lambda 3$ being satisfied, when a numerical aperture necessary for recording information to or reproducing information from the first optical disc is represented by NA1, a numerical aperture necessary for recording information to or reproducing information from the second optical discs is represented by NA2, and a numerical aperture necessary for recording information to or reproducing information from the third optical disc is represented by NA3, a relationship NA1>NA3 and NA2>NA3 being satisfied, when a thickness of a cover layer of the first optical disc requiring use of the first light beam is represented by t1, a thickness of a cover layer of the second optical disc requiring use of the second light beam is represented by t2, and a thickness of a cover layer of the third optical disc requiring use of the third light beam is represented by t3, t1≅0.6 mm, t2≅0.6 mm, and t3≅1.2 mm being satisfied, each of the first and second light beams being incident on the objective lens as a substantially collimated beam, and the third light beam being incident on the objective lens as a diverging beam, at least one of surfaces of the objective lens comprising a first region converging the third light beam on a recording surface of the third optical disc, the first region comprising a step structure configured to have a plurality of concentric refractive surface zones and to give an optical path length difference to an incident beam at each step formed between adjacent refractive surface zones, wherein, in the first region, at least a boundary part of the step structure satisfies a condition:

$$2N+0.70<|\Delta OPD/\lambda 1|<2N+1.30 \tag{1}$$

where N represents an integer, and $\Delta OPD$ (nm) represents an optical path length difference given by the at least a boundary part of the first region to the first light beam, wherein when an optical path difference function $\phi(h)$ defining the step structure is expressed by an equation:

$$\phi(h)=(P_2h^2+P_4h^4+P_6h^6+P_8h^8+P_{10}h^{10}+P_{12}h^{12})m\lambda \tag{2}$$

where $P_2$, $P_4$ and $P_6$ ... are coefficients of second, fourth, sixth ... orders, h represents a height from an optical axis, m represents a diffraction order at which diffraction efficiency is maximized, and λ represents a working wavelength of a light beam being used, the objective lens satisfies a condition:

$$2.50 < (f1 \times P_2)/(t3-t1) < 13.00 \qquad (4)$$

where f1 represents a focal length of the objective lens defined when the first light beam is used.

3. The optical disc drive according to claim 2,
wherein the objective lens is a single element lens having Abbe number satisfying a condition:

$$40 \leq vd \leq 80 \qquad (5),$$

wherein the step structure satisfies a condition:

$$2.70 < |\Delta OPD/\lambda 1| < 3.30 \qquad (6),$$

wherein when a focal length and magnification of the objective lens when the first optical disc is used are respectively represented by f1 and M1, a focal length and magnification of the objective lens when the second optical disc is used are respectively represented by f2 and M2, and a focal length and magnification of the objective lens when the third optical disc is used are respectively represented by f3 and M3, the optical disc drive satisfies following conditions:

$$-0.02 < f1 \times M1 < 0.02 \qquad (7),$$

$$-0.02 < f2 \times M2 < 0.02 \qquad (8), \text{ and}$$

$$-0.12 < f3 \times M3 < -0.04 \qquad (9).$$

4. The optical disc drive according to claim 3,
wherein the step structure satisfies a following condition:

$$1.32 < |\Delta OPDC/\lambda 3| < 1.62 \qquad (12)$$

where ΔOPDC (nm) represents an optical path length difference given by the at least a boundary part of the step structure to the third light beam.

5. The optical disc drive according to claim 2,
wherein the objective lens is a single element lens having Abbe number satisfying a condition:

$$20 \leq vd < 40 \qquad (10),$$

wherein the step structure satisfies a condition:

$$2.70 < |\Delta OPD/\lambda 1| < 3.30 \qquad (6),$$

wherein when a focal length and magnification of the objective lens when the first optical disc is used are respectively represented by f1 and M1, a focal length and magnification of the objective lens when the second optical disc is used are respectively represented by f2 and M2, and a focal length and magnification of the objective lens when the third optical disc is used are respectively represented by f3 and M3, the optical disc drive satisfies following conditions:

$$-0.02 < f1 \times M1 < 0.02 \qquad (7),$$

$$-0.02 < f2 \times M2 < 0.02 \qquad (8), \text{ and}$$

$$-0.38 < f3 \times M3 < -0.30 \qquad (11).$$

6. The optical disc drive according to claim 2, wherein:
the objective lens includes a second region which is formed outside the first region and is configured to converge the first and second light beams on the recording surfaces of the first and second optical discs, respectively, and not to contribute to converging the third light beam;
the second region gives at least an optical path length difference to an incident beam at each step formed between adjacent refractive surface zones; and
an absolute value of an optical path length difference given by each step in the second region is different from an absolute value of an optical path length difference given by each step in the first region.

7. The optical disc drive according to claim 6, wherein:
the optical disc drive satisfies a condition:

$$f1 \times NA1 > f2 \times NA2 \qquad (23);$$

the objective lens includes a third region which is formed outside the second region and is configured to converge only the first light beam on the recording surface of the first optical disc and not to contribute to converging the second and third light beams;
the third region gives at least an optical path length difference to an incident beam at each step formed between adjacent refractive surface zones;
an absolute value of an optical path length difference given by each step in the third region is different from an absolute value of an optical path length difference given by each step in the second region.

8. The optical disc drive according to claim 6, wherein:
the optical disc drive satisfies a condition:

$$f1 \times NA1 < f2 \times NA2 \qquad (24);$$

the objective lens includes a third region which is formed outside the second region and is configured to converge only the second light beam on the recording surface of the second optical disc and not to contribute to converging the first and third light beams;
the third region gives at least an optical path length difference to an incident beam at each step formed between adjacent refractive surface zones;
an absolute value of an optical path length difference given by each step in the third region is different from an absolute value of an optical path length difference given by each step in the second region.

9. An optical disc drive for recording information to and/or reproducing information from three types of optical discs including a first optical disc having a highest recording density, a second optical disc having a second highest recording density and a third optical disc having a lowest recording density by selectively using one of three types of light beams including first, second and third light beams, the optical disc drive comprising an objective lens,
when the wavelengths of the first to third light beams are respectively represented by λ1 (nm), λ2 (nm) and λ3 (nm), a relationship λ1<λ2<λ3 being satisfied,
when a numerical aperture necessary for recording information to or reproducing information from the first optical disc is represented by NA1, a numerical aperture necessary for recording information to or reproducing information from the second optical discs is represented by NA2, and a numerical aperture necessary for recording information to or reproducing information from the third optical disc is represented by NA3, a relationship NA1>NA3 and NA2>NA3 being satisfied,
when a thickness of a cover layer of the first optical disc requiring use of the first light beam is represented by t1, a thickness of a cover layer of the second optical disc requiring use of the second light beam is represented by t2, and a thickness of a cover layer of the third optical disc requiring use of the third light beam is represented by t3, t1≅0.6 mm, t2≅0.6 mm, and t3≅1.2 mm being satisfied,
at least one of surfaces of the objective lens comprising a first region converging the third light beam on a recording surface of the third optical disc, the first region comprising a step structure configured to have a plurality of concentric refractive surface zones and to have at least two types of steps formed between adjacent ones of the plurality of concentric refractive surfaces zones, the at least two types of steps giving different optical path length differences to an incident beam, wherein, in the first region, at least one step type of the two types of steps satisfies a condition:

$$2N+0.70 < |\Delta OPD1/\lambda 1| < 2N+1.30 \quad (13)$$

where $\Delta OPD1$ (nm) represents an optical path length difference given by the at least one step, and N is an integer, wherein when the step structure is defined by at least two types of optical path difference functions expressed by:

$$\phi i(h) = (P_2 i h^2 + P_4 i h^4 + P_6 i h^6 + P_8 i h^8 + P_{10} i h^{10} + P_{12} i h^{12}) m\lambda \quad (14)$$

where $\phi i(h)$ represents an i-th optical path difference function (i: an integer), $P_2 i$, $P_4 i$ and $P_6 i$ ... are coefficients of second, fourth, sixth ... orders of the i-th optical path difference function, h represents a height from an optical axis of the objective lens, m represents a diffraction order at which diffraction efficiency of the incident beam is maximized, and $\lambda$ represents a working wavelength of the incident beam, a condition:

$$2.50 < (f1 \times P_2 1)/(t3-t1) < 13.00 \quad (16)$$

is satisfied for a first optical path difference function, where f1 represents a focal length of the objective lens for the first light beam.

10. The optical disc drive according to claim 9, wherein steps satisfying the condition (13) in the first region further satisfy a condition:

$$2.70 < |\Delta OPD1/\lambda 1| < 3.30 \quad (17).$$

11. The optical disc drive according to claim 10, wherein the steps satisfying the condition (17) in the first region further satisfy a condition:

$$1.32 < |\Delta OPDC1/\lambda 3| < 1.62 \quad (18)$$

where OPDC1 (nm) represents an optical path length difference given by the step structure in the first region to the third light beam.

12. The optical disc drive according to claim 9, wherein steps satisfying the condition (13) in the first region further satisfy a condition:

$$4.70 < |\Delta OPD1/\lambda 1| < 5.30 \quad (19).$$

13. The optical disc drive according to claim 12, wherein the steps satisfying the condition (19) in the first region further satisfy a condition:

$$2.30 < |\Delta OPDC1/\lambda 3| < 2.60 \quad (20)$$

where OPDC1 (nm) represents an optical path length difference given by the step structure in the first region to the third light beam.

14. The optical disc drive according to claim 9, wherein when an optical path length difference given by another step of the at least two types of steps different from the at least one step to the first light beam is represented by $\Delta OPD2$ (nm), the objective lens satisfies a condition:

$$2L - 0.20 < |\Delta OPD2/\lambda 1| < 2L + 0.20 \quad (21).$$

15. The optical disc drive according to claim 14, wherein the objective lens satisfies a condition:

$$1.80 < |\Delta OPD2/\lambda 1| < 2.20 \quad (22).$$

16. The optical disc drive according to claim 9, wherein:
the objective lens includes a second region which is formed outside the first region and is configured to converge the first and second light beams on the recording surfaces of the first and second optical discs, respectively, and not to contribute to converging the third light beam;
the second region gives at least an optical path length difference to an incident beam at each step formed between adjacent refractive surface zones; and
an absolute value of an optical path length difference given by each step in the second region is different from the $|\Delta OPD1/\lambda 1|$.

17. The optical disc drive according to claim 16, wherein:
the optical disc drive satisfies a condition:

$$f1 \times NA1 > f2 \times NA2 \quad (23);$$

the objective lens includes a third region which is formed outside the second region and is configured to converge only the first light beam on the recording surface of the first optical disc and not to contribute to converging the second and third light beams;
the third region gives at least an optical path length difference to an incident beam at each step formed between adjacent refractive surface zones;
an absolute value of an optical path length difference given by each step in the third region is different from an absolute value of an optical path length difference given by each step in the second region.

18. The optical disc drive according to claim 16, wherein:
the optical disc drive satisfies a condition:

$$f1 \times NA1 < f2 \times NA2 \quad (24);$$

the objective lens includes a third region which is formed outside the second region and is configured to converge only the second light beam on the recording surface of the second optical disc and not to contribute to converging the first and third light beams;
the third region gives at least an optical path length difference to an incident beam at each step formed between adjacent refractive surface zones;
an absolute value of an optical path length difference given by each step in the third region is different from an absolute value of an optical path length difference given by each step in the second region.

* * * * *